United States Patent
Mysore et al.

(10) Patent No.: US 12,349,083 B2
(45) Date of Patent: Jul. 1, 2025

(54) DEVICE SYNCHRONIZATION AND CONNECTION MANAGEMENT IN WIRELESS NETWORKS

(71) Applicant: Cypress Semiconductor Corporation, San Jose, CA (US)

(72) Inventors: Manamohan D. Mysore, Ramona, CA (US); Ash Kapur, Frederick, MD (US); Michael Chandler, Corona del Mar, CA (US); Victor Zhodzishsky, Potomac, MD (US)

(73) Assignee: Cypress Semiconductor Corporation, San Jose, CA (US)

( * ) Notice: Subject to any disclaimer, the term of this patent is extended or adjusted under 35 U.S.C. 154(b) by 530 days.

(21) Appl. No.: 17/566,356

(22) Filed: Dec. 30, 2021

(65) Prior Publication Data
US 2022/0408382 A1    Dec. 22, 2022

Related U.S. Application Data

(60) Provisional application No. 63/211,691, filed on Jun. 17, 2021.

(51) Int. Cl.
*H04W 56/00* (2009.01)
*H04W 4/80* (2018.01)

(52) U.S. Cl.
CPC .......... *H04W 56/001* (2013.01); *H04W 4/80* (2018.02)

(58) Field of Classification Search
CPC . H04W 56/001; H04W 4/80; H04W 56/0015; H04W 76/14
See application file for complete search history.

(56) References Cited

U.S. PATENT DOCUMENTS

| 9,668,209 | B1 | 5/2017 | Knaappila |
| 9,794,880 | B1 | 10/2017 | Yamato |
| 11,153,701 | B2 | 10/2021 | Sridharan et al. |

(Continued)

OTHER PUBLICATIONS

US Non Final Office Action from U.S. Appl. No. 17/566,364 dated Apr. 4, 2024; 13 pages.

(Continued)

*Primary Examiner* — Chi H Pham
*Assistant Examiner* — Raul Rivas

(57) ABSTRACT

Implementations disclosed describe techniques and systems to facilitate efficient operations of wireless networks organized in a topology of communicating nodes. Techniques include cascade synchronization of various nodes of the network by generating and maintaining a common time using times associated with ordered communications between nodes. The common time maintained by the network allows performance of synchronous action for precise industrial, medical, and testing applications. The described techniques and systems further include management of communication windows between different nodes in a way that facilitates fast and efficient propagation of data collected by the network from multiple source nodes to one or more destination nodes. The techniques further include efficient assignment and flexible management of communication frequencies (channels) to various nodes of the network to reduce interference and noise by assigning different communication frequencies to the nodes that utilize concurrent communications windows.

15 Claims, 11 Drawing Sheets

(56) References Cited

U.S. PATENT DOCUMENTS

| | | |
|---|---|---|
| 2007/0211681 A1 | 9/2007 | Sun et al. |
| 2015/0061931 A1 | 3/2015 | Krasner et al. |
| 2015/0201389 A1 | 7/2015 | Linsky et al. |
| 2017/0086098 A1 | 3/2017 | Kwon et al. |
| 2020/0133891 A1 | 4/2020 | Chazot et al. |
| 2020/0344784 A1* | 10/2020 | Tang ................. H04W 72/0446 |
| 2020/0359159 A1* | 11/2020 | Krzych ................. G01S 5/0294 |
| 2020/0387613 A1* | 12/2020 | Zimny .................... H04L 12/12 |
| 2022/0014295 A1 | 1/2022 | Bonde et al. |
| 2022/0200716 A1 | 6/2022 | Bonde et al. |
| 2023/0188384 A1 | 6/2023 | Claffey et al. |

OTHER PUBLICATIONS

US Non Final Rejection from U.S. Appl. No. 17/566,359 dated Nov. 14, 2023; 19 pages.
US Non Final Office Action from U.S. Appl. No. 17/566,359 dated Nov. 19, 2024; 20 pages.

* cited by examiner

DEVICE SYNCHRONIZATION AND CONNECTION MANAGEMENT IN WIRELESS NETWORKS

RELATED APPLICATIONS

This application claims the benefit of U.S. Provisional Application No. 63/211,691, filed Jun. 17, 2021, the entire contents of which is being incorporated herein by reference.

TECHNICAL FIELD

The disclosure pertains to wireless networks; more specifically, to time synchronization of devices of wireless networks, and management of the connections between devices of wireless networks.

BACKGROUND

Personal area networks, such as Bluetooth (BT), use the 2.4 GHz radio frequency band to provide wireless connection for various personal industrial, scientific, and medical applications. BT networks use a packet-based protocol and have an architecture that includes central devices and peripheral devices. A central device can communicate with multiple peripheral devices. Typically, data is transferred between a central device and a specific peripheral device during a specific time allocated for communications between the two devices. At a designated time, a peripheral device can tune-in to receive messages and data from the central device and, in turn, transmit data to the central device. Bluetooth Low Energy (BLE) networks have communication ranges that are similar to that of BT networks but have a considerably smaller power consumption and cost. BLE devices often remain in a sleep mode and transition to an active mode when data communication is about to happen. BLE protocol also supports scatternet networking, in which a single device may act as both the central device of one or more communication connections and the peripheral device of one communication connection.

DETAILED DESCRIPTION

Figure 1:
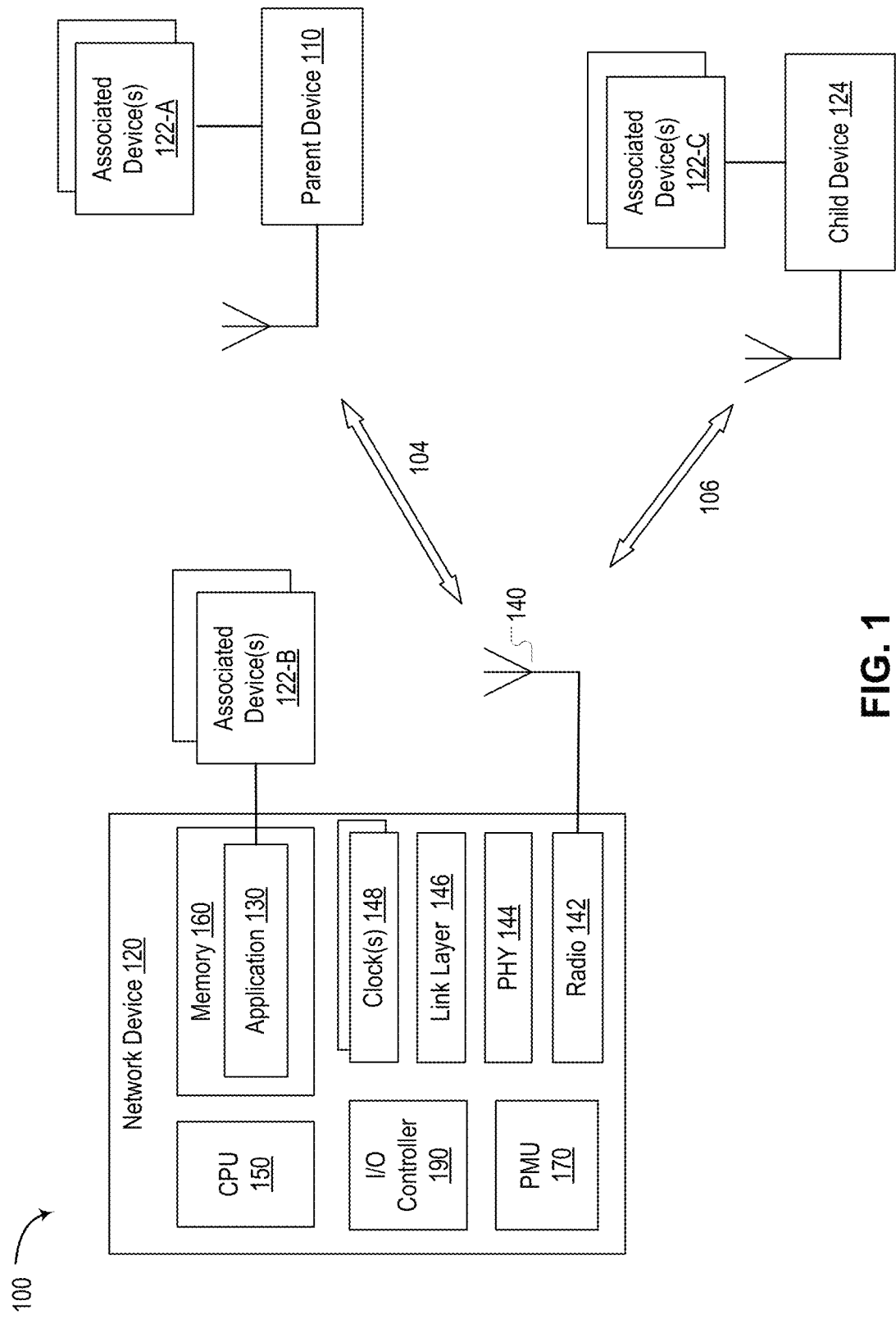
FIG. 1 is a diagram of a wireless network system in which time synchronization, time multiplexing, frequency multiplexing, synchronous actions and various other techniques described in the present disclosure may be performed, according to some implementations.

In many personal, industrial, scientific, and medical applications, time synchronization of separate devices may provide significant benefits. Under dynamic conditions, when a state of a system supported by a wireless network varies with time, there may be an advantage to performing a measurement or initiating some other action by multiple devices simultaneously. For example, performance of electric vehicles may depend on uniformity of charging and discharging of multiple high-voltage battery cells. Accurate simultaneous (synchronous) measurements of the state of each cell may provide data that can be used to optimize battery utilization during acceleration, cruising, braking, and various other maneuvers of the vehicle, as well as data during charging. Similarly, medical devices may be configured to collect simultaneous data from multiple parts of the patient's body. Industrial testing (e.g., crash testing of a car or any other safety-sensitive equipment) may rely on synchronization of measurements performed by multiple sensors. Such a synchronization is typically achieved through a wired connection, which can be used to ensure that all signals are generated, sent and/or, received simultaneously. Wired connections, however, may be cumbersome to install and maintain, especially where a large number of miniature devices are integrated and used as a part of a larger system. In some instances, wired connections to a large number of peripheral devices may not only be inconvenient but may be impractical or even unsafe. Therefore, it may be advantageous to deploy wireless sensors/devices that are easier to install, maintain, or replace than wired devices.

Wireless devices, being largely independent from each other, may have clocks that run with somewhat different speeds compared with other clocks; e.g., different clocks may have a slightly different drift, jitter, etc. It is thus beneficial to synchronize all or at least some of the wireless devices. For example, devices operated using a BT, BLE, or some other wireless network technology, could be synchronized by a suitably prepared signal exchanged between a central device (also referred to herein as a parent device) and various peripheral devices (referred to herein as child devices).

Wireless devices in a testing and control system may be organized into hierarchical wireless networks with multiple layers of nodes. More specifically, the wireless devices (nodes) of the lowest layer may collect sensing data and relay the collected data to the nodes of the next layer, and so on. Each node of a given layer may collect data from multiple nodes of the previous layer, as well as add a data collected by that node, and pass the aggregated data further up the network of nodes, until all data is collected by a root node (a top node, a senior node, a central node, etc.). Additionally, the root node may propagate instructions to the lower nodes in the reverse direction. In some networks, the root note may propagate data (e.g., audio data) that is to be delivered synchronously to multiple users or user devices (e.g., to multiple speakers). In such complex scatternet topologies of wireless nodes, a single device may act as both a parent device (e.g., the device that dictates parameters of a connection with one or more child devices) and a child device (e.g., the device that follows the instructions of a parent device for communication with the parent device). Similarly, in a wireless mesh network, the flow of data is not rigidly defined and may take many paths through different sets of nodes to reach a destination device.

Efficient operations of such wireless networks present a number of technological challenges. In addition to time synchronization, for concurrent measurements or data delivery, a wireless network may have to be optimized for increased throughput, e.g., to ensure that the collected data (or instructions) is delivered to (or from) the root node as quickly as possible. A parent device needs to collect data from multiple child devices before the parent device can upload the data to its own parent device. A delay in collecting data may cause the parent device to miss the communication window allocated for the data upload and idle until its own parent device opens up the next communication window. Such delays may be aggravated with each subsequent layer of nodes. As a result, the data from various sensors may reach the destination device (e.g., the root node) at a variety of different times, and in some instances too late for useful processing by the destination device.

Additionally, multiple parent devices (nodes) of each layer may be receiving data from their child devices at the same time. In compact systems (e.g., electric batteries), the distance between various communicating devices may be relatively small, causing a substantial radio interference to occur between different communication links. Consequently, data packets may be lost on some occasions thus further exacerbating the data delivery problems.

Aspects and implementations of the present disclosure address at least some of these and other limitations of the existing technology by enabling systems and methods of accurate clock synchronization in wireless networks, efficient staging of time-multiplexed communication windows to minimize time delays, and frequency multiplexing of simultaneous communications that use different wireless links. For example, techniques of cascade time synchronization are disclosed, where a given node synchronizes/adjusts its clock based on a periodic (with known period) sequence of communications received from the node's parent device and communicates with the node's child devices at times that are determined using the synchronized/adjusted clock. As a result, the time synchronization process propagates from the top node to the nodes of the lowest layer. In some implementations, connections of the node with its child devices are staged (spaced) with intervals that allow individualized collection of data from each child device to occur prior to the node's communication window for data upload to the node's own parent device. As a result, data propagates up the network of wireless links over an efficiently ordered sequence of uploads until all collected data reaches the top node within an optimal time. In some implementations, multiple parallel uploads may occur concurrently using different frequencies (wireless communication channels) that are spaced out to reduce interference. Numerous other systems, methods, and techniques are further described below.

FIG. 1 is a diagram of a wireless network system 100 in which time synchronization, time multiplexing, frequency multiplexing, synchronous actions and various other techniques described in the present disclosure may be performed, according to some implementations. Depicted is a network device 110 that can support wireless connections and data exchanges with multiple devices. Network device 120 may communicate with a parent device 110. Network device 120 may also communicate with a child device 124. Even though a single child device is depicted, network device 120 may support wireless connections with any number of child devices (and, similarly, with multiple parent devices). Depicted are some components and modules of network device 120, as discussed in more detail below. Although no internal structure is depicted for parent device 110 and child device 124, it will be understood that some or all components of network device 120 may also be present in parent device 110, child device 124, and other devices of the wireless network system 100.

Parent device 110 may have a wireless connection 104 with network device 120, and network device 120 may have a wireless connection 106 with child device 124, as indicated schematically with the corresponding arrows. Wireless connections (also referred to herein as wireless links) 104 and 106 may be Bluetooth (BT) connections, Bluetooth Low Energy (BLE) connections, or any other suitable connections. Some or all devices (e.g., nodes) of wireless network system 100 may be associated (and may communicate, e.g., using a bus or a wired connection) with one or more additional devices, e.g., parent device 110 may be associated (and communicatively coupled) with one or more devices 122-A, network device 120 may be associated with one or more devices 122-B, and child device 124 may be associated with one or more devices 122-C. In some implementations, various devices of wireless network system 100 (including various associated devices) are configured to perform one or more synchronous actions.

Parent device 110 may send one or more messages via wireless link 104 to be used by network device 120 for time synchronization. Parent device 110 may form a wireless communication link with a parent device of its own, and may receive instructions from that parent device. Parent device 110 may be a central node of wireless network system 100 (control device), and may be generating instructions for network device 120 (as well as various child devices of network device 120). In some implementations, one of associated devices 122-A may be a control device for the entire wireless network system 100. Network device 120 may send one or more messages to child device 124 to be used to by child device 124 to initiate or maintain time synchronization with network device 120. In particular, network device 120 may act as a child device (peripheral device) with respect to wireless communication link 104 and as a parent (central device) with respect to wireless communication link 106. Child device 124 may also have one or more of its own child devices (mot shown), and may, in turn, transmit messages to those child devices to further extend the time synchronization process. In some implementations, some or all of the devices of FIG. 1 may form communications with multiple other devices. In some implementations, designations of parent, child, central, peripheral, etc., may be changeable; e.g., the wireless device network may be re-configured. In some implementations, the wireless device network may be a wireless mesh network where roles of devices may be dynamic.

An event of sending or receiving of a message may mark a time used by devices of wireless network system 100 for synchronization. In some implementations, child devices may use the time of reception of a message from the parent device to perform time synchronization. Network device 120 may use reception of one or more messages via link 104 to enable time synchronization and data exchange with parent device 110. Child device 124 may use reception of one or more messages via link 106 to enable time synchronization and data exchange with network device 120. Communicated messages may include explicit indications of time, such as time stamps (e.g., clock values at the time of generation of the respective messages), a future time for performing a specific action, an indication of a connection interval, an indication of a connection event count, etc. The cascade time synchronization may be performed as follows. Network device 120 may use one or more messages sent by parent device 110 to enable synchronization with parent device 110, and child device 124 may use one or more messages sent by network device 120 to enable synchronization with network device 120, e.g., after the latter has established synchronization with parent device 110. In this way, all devices of the network may become synchronized.

Network device 120 (and, similarly, parent device 110, child device 124 or any other device of wireless network system 100) may be any device supporting the network connectivity and functionality (e.g., receiving, sending, and relaying data), such as a desktop computer, a laptop computer, a tablet, a phone, a smart TV, a sensor, a lighting device, an electric battery, an electric generator, an appliance, a controller (e.g., an air conditioning, heating, water heating controller), a lock, a component of a security system, a location beacon, or any other type of network devices. Network device 120 may support a synchronization application 130, which may be a module (e.g., a software, firmware, hardware component, or any combination thereof) that performs time synchronization and facilitates synchronous actions by network device 120 (or an associated device 122-B). In some implementations, synchronous action by network device 120 is performed simultaneously with actions by other devices, e.g., by parent device 110, child device 124, or other devices of wireless network system 100, or devices associated with any of the aforementioned devices. In some implementations, synchronous action by network device 120 may be performed non-simultaneously with actions performed by other devices but according to a predetermined pattern. For example, parent device 110 may perform an action at a first predetermined time, network device 120 may perform another (or a similar) action at a second predetermined time (which may be earlier or later than the first predetermined time), and so on. Synchronization application 130 on network device 120 may operate in conjunction with a similar application instantiated on parent device 110, e.g., receiving instructions from parent device 110 providing data to parent device 110. Synchronization application 130 may be an industrial application, a vehicle application, a safety application, a measurement control application, a technical control and monitoring application, a smart home control application, a navigation application, a robotic application, or the like. Synchronization application 130 may receive (and process) indications from parent device 110 that include a time associated with a synchronous action, time synchronization, data exchange, etc. The received indications may cause associated devices 122-B to perform one or more operations in conjunction with the synchronous action, collect data from the associated device 122-B, process and communicate the collected data to parent device 110, and so on. Application 130 may also generate messages that are sent to child device 124 to facilitate synchronization between child device 124 and network device 120.

Network device 120 (and other devices of wireless network system 100) may be capable of a wireless connectivity at a single radio band (e.g., 2.4 GHz band, 5 GHz, 60 GHz, etc.) or multiple bands (e.g., both 2.4 GHz and 5 GHz bands). Network device 120 may use (or be connected to) one or more antennas 140, which are used to receive and transmit radio wave signals. In some implementations, antenna(s) 140 may be or include a single multi-input multi-output (MIMO) antenna. A signal received by antenna(s) 140 may be processed by a radio component 142, which may include filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 140. Radio component 142 may provide the received (and digitized) signals to a physical layer component (PHY) 144. PHY 144 may convert the digitized signals into frames that can be fed into a Link Layer 146. Link Layer 146 may have a number of states, such as advertising, scanning, initiating, connection, and standby. Link Layer 146 may transform frames into data packets. During transmission, data processing may occur in the opposite direction, with Link Layer 146 transforming data packets into frames that are then further transformed by PHY 144 into digital signals provided to radio component 142. Radio component 142 may convert digital signals into analog radio signals and transmit the radio signals using antenna(s) 140. In some implementations, radio component 142, PHY 144, and Link Layer 146 may be implemented as parts of a wireless controller, e.g., a wireless controller implemented as a single integrated circuit.

Network device 120 (or other devices) may include one or more central processing units (CPUs) 150. In some implementations, CPU 150 may include one or more finite state machines (FSMs), field-programmable gate arrays (FPGAs), application-specific integrated circuits (ASIC), or the like. Network device 120 may have a single processor that executes various operations related to synchronization and may also support any other processes running on network device 120. In some implementations, network device 120 may have a dedicated processor for synchronization operations that is separate from other processes and applications running on network device 120. Network device 120 may further include a memory device 160, which may be (or include) a non-volatile, e.g., read-only (ROM) memory, and volatile, e.g., random-access (RAM), memory. Memory device 160 of network device 120 may also store codes and supporting data for synchronization application 130.

Network device 120 may further include one or more clocks 148 and a power management unit (PMU) 170, which may manage clock/reset functions and power resources. Network device 120 may further contain an input/output (I/O) controller 190 to enable communications with other external devices and structures, including associated devices) 122-B. In some implementations, I/O controller 190 may enable a general purpose I/O (GPIO) interface, a USB interface, a PCM digital audio module, and other I/O components.

Wireless Device Time Synchronization and Drift Management

In some aspects of the current disclosure, wireless devices communicate in a connected mesh or tree of nodes. In some embodiments, instructions for managing the wireless network may be sent from a central, root, or aggregation node out to nodes further down a tree network. Data (e.g., measurement data) may flow from the lower nodes to the central node. In some embodiments, a time synchronization system may be implemented based on messages sent between nodes of the network. The time synchronization system may enable all nodes establishing or updating a common understanding of time each connection event.

Figure 2:
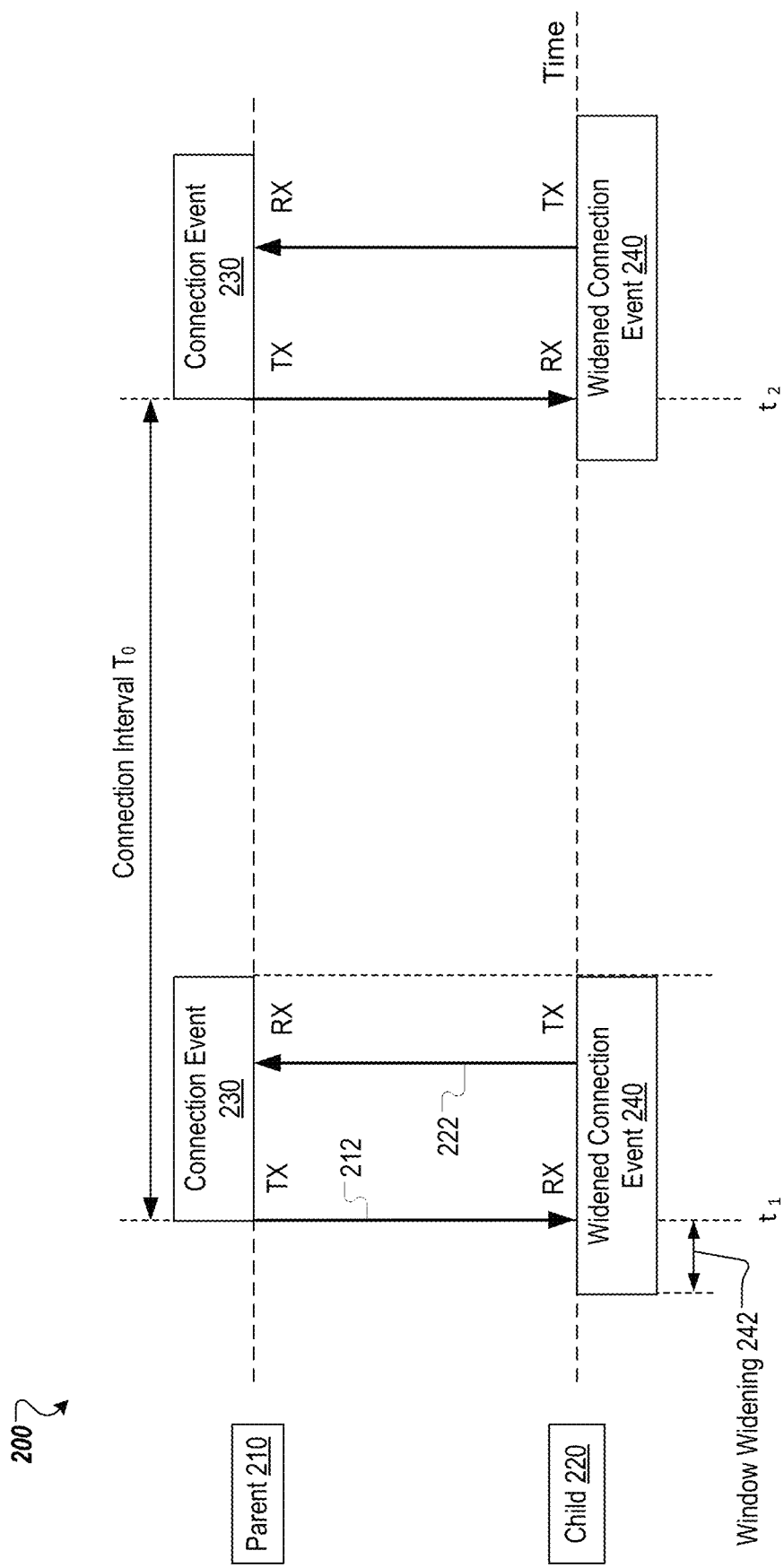
FIG. 2 illustrates an example clock synchronization event in wireless networks using a message sent by a parent device and a known schedule of communication with the parent device, according to some implementations.

FIG. 2 illustrates an example clock synchronization event 200 in wireless networks using a message 212 sent by a parent device and a known schedule of communication with the parent device, according to some implementations. Depicted schematically in FIG. 2 are operations of a parent device (e.g., central device, parent network device, etc.) 210 and a child device (e.g., peripheral device, child network device, etc.) 220. Parent device 210 and child device 220 may be a part of a Bluetooth (BT) network, a BT Low Energy (BLE) network, or any other wireless network. Parent device 210 and child device 220 may have previously established a wireless network connection. Although depicted in FIG. 2, for brevity and conciseness, is a single child device 220, parent device 210 may be concurrently supporting connections with multiple child devices. Various devices depicted in FIG. 2 may be communicatively coupled (e.g., via a wired connection, a bus, or wirelessly) with one or more associated devices. In some implementations, parent device 210 and child device 220 may be monitoring a state of the associated device(s) or facilitating operations of the associated device(s). For example, child device 220 (and/or various other devices that are not shown in FIG. 2) may be associated with one or more cells of a battery (e.g., an automotive battery of an electric vehicle) and may be performing (or facilitating) measurements of a state of the cells of the battery. The measurements may be performed periodically or at times determined by a host controller communicating with devices of the wireless network. Child device 220, parent device 210, and/or various other devices may be integrated into a battery pack. The battery may be used to power an electric motor that propels an electric vehicle. As the battery is powering the motor of the vehicle, battery cells may be in a constant state of discharging (and/or charging, e.g., during braking), which may occur differently in different cells. To perform meaningful and accurate measurements of the state of different cells, various devices of the wireless network may perform the measurements (or cause the measurements to be performed by associated sensors coupled to the cells) synchronously.

In some implementations, synchronous actions by the devices of the wireless network are enabled by allowing various devices of the wireless network to determine the difference of their internal clocks with a clock of at least one other reference device in the network, e.g., parent device 210. The determined clock differences may be used to perform synchronous actions simultaneously on multiple devices. In some implementations, clock synchronization 200 may be facilitated by the specification of a wireless protocol of the wireless connections. For example, as may be set by parent device 210 during initial establishment of a connection between parent device 210 and child device 220, connection events (occurring during a period of time defined by connection event 230) may be spaced by a fixed connection interval $T_0$.

In some implementations, clock synchronization 200 may be achieved as follows. Parent device 210 may send, at the beginning of scheduled connection event 230, a message 212 to child device 220. Child device 220 may be expecting the start of connection event 230. In particular, child device 220 may power up radio circuitry as well as other hardware, software, circuitry, and the like, in preparation to receiving message 212. Child device 220 may begin listening to communications from parent device 210 at a certain time before the onset of connection event 230, thus enabling a widened connection event 240, e.g., by adding some window widening 242 to the anticipated start of connection event 230 of parent device 210. Window widening 242 may assist child device 220 in communicating (e.g., exchanging messages) with parent device 210 by anticipating a possibility that the clocks of parent device 210 and child device 220 are not perfectly synchronized, e.g., due to differing jitter, drift, etc., experienced by the clocks. In some embodiments, connection event 230 and widened connection event 240 may each include a transmission (TX) portion and a reception portion (RX). The TX portion of connection event 230 may occur before the RX portion of connection event 230. The TX portion of connection event 230 may correspond to the RX portion of widened connection event 240, and the RX portion of connection event 230 may correspond to the TX portion of widened connection event 240. In some embodiments, window widening 242 may be applied to only the RX portion of widened connection event 240, to provide protection against clock jitter, drift, offset, etc., between parent device 210 and child device 220.

In some implementations, child device 220 may record a time stamp, according to the internal clock of child device 220, at a time of reception of message 212 (e.g., upon a receiving hardware detecting a message header, message access code, etc.). In some implementations, child device 220 may generate a current clock time based on the time of reception of message 212. Child device 220 may incorporate other information to generate the synchronized clock time, such as utilizing an expected time of arrival of message 212. In some implementations (e.g., if the wireless network comprises a BLE wireless network), the expected time of arrival of message 212 may be determined from a connection event count (e.g., a number of connection events occurred since the connection was established, changed, reset, etc.) and the connection interval $T_0$. The connection event count may be tracked by parent device 210 and child device 220 separately. In some implementations, message 212 may include an explicit indication of time to facilitate synchronization of the internal clocks of parent device 210 and child device 220. Message 212 may include a connection event counter, for example to protect against lost messages, disrupted communications, interference, etc. Message 212 may further include a time stamp, a timing offset, etc. to facilitate generation of a common indication of time.

As a first example implementation, parent device 210 and child device 220 may form a wireless communication connection. Parent device 210 and child device 220 may share a common time established via a unilateral time synchronization. More specifically, parent device 210 may maintain its clock independently from clocks of child devices, whereas child device 220 may perform periodic corrections (time adjustments) to ensure that the clock of child device 220 is aligned with the clock of parent device 210. Parent device 210 may schedule a time of communication for parent device 210 and child device 220 to exchange messages (e.g., message 212, message 222, etc.) based on the clock of parent device 210. Child device 220 may prepare to receive a message by opening widened connection event 240. Parent device 210 may send message 212 at the designated time (as measured by the clock of parent device 210), at the onset of connection event 230, denote as time $t_1$, which may be also a time when child device 220 (as measured by its own clock) is expecting the communication from parent device 210 to begin. When communication hardware of child device 220 detects message 212 (e.g., by detecting a header or access code communicated by parent device 210), child device 220 may record a time stamp $t_{TS}$, e.g., as measured by the clock of child device 220. A processing device of child device 220 may then record the difference (time correction), $\Delta t_1 = t_1 - t_{TS}$, between the expected time of communication $t_1$ and the actual recorded time of communication $t_{TS}$. Subsequently, when child device 220 is instructed (by parent device 210, the root node, etc., to perform an action (e.g., a synchronous action) at a target time $t_{Target}$, child device 220 may perform the action at the corrected time (as measured by child device's clock), $t_{Target} + \Delta t_1$. The time correction may then be updated ($\Delta t_1 \rightarrow \Delta t_2 \rightarrow \Delta t_3 \rightarrow \ldots$) during subsequent connection events (e.g., at times $t_2$, $t_3$, etc.) with parent device 210. The operations of parent device 210 sending a message, child device 220 receiving and recording a time stamp, and child device 220 updating the time correction $\Delta t_j$ may be repeated as necessary (e.g., periodically, every connection event, every n connection events, etc.) to maintain a target accuracy of time synchronization between the two devices.

As a second example implementation, parent device 210 and child device 220 may establish a communication connection and a common time as follows. The communication connection may be a BLE connection, with an established (e.g., at the time of setting up the connection) connection interval $T_0$. When a wireless connection is established between two nodes, the nodes may share an understanding of a connection event counter (CEC) for each connection event. A child device uses a packet received from the parent device to synchronize the clock of the child device, e.g., when a hardware of the child device recognizes that a packet has been received, the hardware establishes a common epoch, where the parent device and the child device are time-synchronized.

Upon reception of message 212, child device 220 may update a connection event counter, which may be an indication of how many connection events have been scheduled since some previous time, such as the onset of the communication connection. Child device 220 may then use connection interval $T_0$ to generate a common indication of time. For example, the expected time of reception of message 212 (e.g., according to the clock of parent device 210) may be given by $t_{exp} = CEC \times T_0 + T_{offset}$, where $C_{ConEv}$ is a counter of connection events and $T_{offset}$ is a time offset assigned (e.g., during initial connection with parent device 210) to child device 210 relative to the starting time of the connection interval $T_0$. Any two connected nodes (e.g., parent device 210 and child device 220) may establish a common timestamp based on the connection event counter. For example, parent device 2100 may share a data tuple (CEC, timestamp) after the connection with child device is established, and therefore establishes the timestamp in the child device 220. The timestamp of child device 220, although tied to that of parent device 210, can drift from the timestamp of parent device 210. To compensate for this drift, when child device 220 receives a communication from parent device 210, child device increments connection event counter CEC+1→CEC, and uses the above formula to correct the timestamp on child device. For example, child device 210 may use the time of receiving a first packet of n-th connection event to set its clock to be $t_{exp} = CEC(n) \times T_0 + T_{offset}$ at the time of reception of the first packet The described technique allows to quickly establish a synchronized time between a parent device a child device. In some implementations, child device 220 may use the counter, the connection interval, and the time offset to determine the expected reception time $t_{exp}$, and then use the actual time of reception of message 212 as measured by the child device's clock to calculate the time correction $\Delta t_j$ (after recording the counter value $C_{ConEv} = j$). Other equations may be used to establish a common time between devices and still be within the scope of this disclosure. In some implementations, parent device 210 may communicate some information for use in clock synchronization and child device 220 may provide other information. For example, parent device 210 may include in message 212 the actual time of transmission (or generation) of message 212 (measured by the clock of parent device 210) and child device 220 may determine the actual time of arrival of message 212 (by the clock of child device 220). Child device 220 may then determine the difference of the two times as the current time correction $\Delta t$. In some implementations, child device 220 can further adjust the time correction using an estimate of time delay in transmission and reception of message 212.

In some implementations, parent device 210 may send message 212 which includes a connection event counter and an indication of time (e.g., a time stamp). Parent device 210 may then send subsequent messages which do not include this information, and child device 220 may manage (e.g., increment) counter when subsequent messages are received. In some implementations, parent device 210 may, at a later time, resend (or update) the connection event counter and provide a new time stamp. Such a later message that includes the updated information may be sent responsive to, for example, a triggering event, such as a loss and reestablishment of connection with child device 220, an update to connection parameters (e.g., a change to connection interval $T_0$, a change of communication frequency, etc.), or the like.

Establishing time synchronization may be accomplished in a variety of ways. In one implementation, managing connection events and maintaining the time correction may be performed using multiple clocks (e.g., clocks 148 of FIG. 1). For example, prior to expected start (e.g., $t_1$) of connection event 230, software (e.g., firmware) executed by a processor of child device 220 may advance a first clock (e.g., an internal device clock, etc.) by an amount of an intended level of window widening 242 causing the first clock to start a reception interval (e.g., open widened connection event 240) prior to $t_1$. At the time of reception of message 212 (e.g., the message's header or access code), the hardware may adjust the first clock of child device 220 in such a way that the actual time of reception of message 212 matches the expected time of reception $t_1$. The time-adjusted first clock may then be used to update a second clock (reference clock) maintained separately on child device 220. The first clock may then be advanced again in anticipation of the next connection event that is expected to start at time $t_2$. In the meantime, the updated second clock may maintain the synchronized time with the parent device (and, therefore, with other devices of the network) and may be used to determine a timing of various actions performed by child device 220, e.g., synchronous actions. In some implementations, the expected times of reception $t_1$, $t_2$, etc., may be communicated from parent device 210 to child device 220 in advance (e.g., during initial connection setup) or during a previous connection event 230 (e.g., as part of message 212). In some implementations, the expected times of reception may be calculated by child device 220 in view of a connection interval, a connection event count, or the like.

In some implementations, a single clock manages connection events and maintains a time correction. For example, at the time of reception of message 212, child device 220 may create a time stamp. Software of child device 220 may then determine and maintain (e.g., as described above) the difference Δt between the time of arrival of the message, as measured by the internal clock of child device 220 (e.g., the time stamp) and the expected time of arrival of the message. The software then plays the role of the reference clock by scheduling various actions by child device 220 using the internal clock that is adjusted by Δt. Similarly, the software maintains the intended size of window widening 242 and causes child device 220 to open widened connection event(s) 240 at appropriate times.

In some implementations, child device 220 may receive message 212, and may schedule (based on data received by in message 212, data received in another message, data generated by child device 220, etc.) a time for a future action by adding some interval to the time of reception of message. For example, message 212 may include indication that an event (e.g., a future connection event, a synchronous action or measurement, etc.) is to occur after a certain time delay (interval) from the time of reception of message 122. Child device 220 may compute a target time of action by adding the delay to the current (at the time of reception) clock value and, when the clock reaches the target value, perform the action. In some implementations, various devices associated with the nodes of a wireless network may be configured to perform a synchronous action, and may use methods such as those described above to achieve clock synchronization. In one example, a battery management system for a multi-cell battery (e.g., the battery of an electric vehicle) may perform simultaneous measurements of properties of various cells. In another example, a medical sensing system may perform simultaneous measurements of a state of various parts of a patient's body. Devices that perform such measurements (e.g., of a battery or patient's body) may be associated with nodes of the wireless network that are synchronized using one or more methods described above.

In some implementations, child device 220 may correct for the time delay that passes between parent device 210 sending message 212 and child device 220 receiving message 212 (e.g., air time, processing time, etc.), which is illustrated schematically with the oblique arrow indicating communication of message 212 in FIG. 2. For example, the time synchronization may be performed by adding an estimated time delay, an average time delay measured in field testing, and the like. In some implementations, the time delay is not taken into account. For example, synchronization tolerance of clocks of the various devices (in view of the accuracy of applications performed by the device) may be such that accounting for the delay does not bring significant additional benefits.

The technique of time synchronization may be extended to other nodes of the network. More specifically, intermediate nodes may translate the timestamps (determined from their connections to the respective parent nodes) to the child nodes. After the intermediate node established (received) timestamp tuple (CEC, timestamp) during one of the intermediate node connection events to its parent node, the intermediate node may translate a new tuple (CEC(j), timestamp(j)) for each connection to child node j. The child node then, in turn, translates the timestamp to its children. This process establishes a timestamp within the full topology of the network. Each level of the tree of nodes involves some error in the timestamp, and multiple levels of the tree can increase the error. Yet as long as the nodes are periodically exchanging packets, and thereby synchronizing clocks, this error may be meaningfully contained.

The CEC/timestamp tuples may be generated and transmitted between a parent device and a child devices at the time (or after) the respective connection is first established. In some implementations, it may be sufficient to generate and send this tuple once and use generated CEC/timestamp tuple for the rest of the lifetime of the connection. In some implementations, CEC/timestamp tuple may be updated one or more times via a message from the parent node to the child node. For example, connection parameters may have to be updated via the Connection Update procedure. In some implementations, CEC/timestamp tuple may be transmitted in application-level messages. In some implementations, CEC/timestamp tuple may be transmitted via custom Link Level messages.

The advantages of the disclosed techniques of establishing timestamp in the full topology of nodes include (but are not limited to) accuracy, efficiency and resilience (to lost packets). For example, if a high quality Low Power Oscillator (LPO) clocks are being used, the accuracy of timestamps can be ~5-10 us in a tree of depth 2 and for a connection interval of 100 ms. The disclosed techniques have low demands to the bandwidth and low power consumption, use as little as one parent-child communication to synchronize time and can be established quickly in an arbitrary topology of nodes.

Clock Drift Management and Link Coupling

Clocks of different devices may be aligned (synchronized) as described above. Additionally, the aligned clocks of various device have to maintain this alignment by tracking and/or adjusting the timing of the communication links to child nodes to be in alignment with the links to the parent node(s), after synchronization communications are received from the parent node(s). As a result, a fixed relationship between parent and child communication links are enforced upon such synchronization. In some implementations, this may be implemented via coupling of a leader link to a follower link. For example, a link to a parent may be the leader link. When synchronization is performed using a communication received via the leader link, the timing of the follower link is updated and brought in alignment with the leader link. For example, a fixed offset is determined for the follower link using a clock adjustment procedure that updates the time offset between the leader and follower link to the new offset. If the leader link and the follower links are maintained via separate hardware clocks, the clock for the follower link may be updated based on the synchronization with the leader link.

Such a maintenance of alignment between two links is may be referred to as link coupling. Link coupling is distinct from what is known as clock dragging, where the timing of one link is slowly adjusted (dragged) to be in better alignment with another clock. Link coupling involves updating the timing of the follower link to be in alignment with the leader link, so that changes in timing of the leader link lead to immediate changes in the timing of the follower link. As a result clock drift cannot pull the two links away from optimal alignment.

Link coupling may also be used in a multi-device topology of nodes (as depicted below in FIG. 3), which include a root node to which data is streamed from other nodes or, alternately, from which data is streamed to the other. Connections between the nodes may be dedicated Bluetooth (BR/EDR or LE) connections. Some or all connections may have the same or similar connection intervals. As described below, data transfer in such a tree of nodes may be optimized to achieve low latency and a low rate of retransmission.

Figure 3:
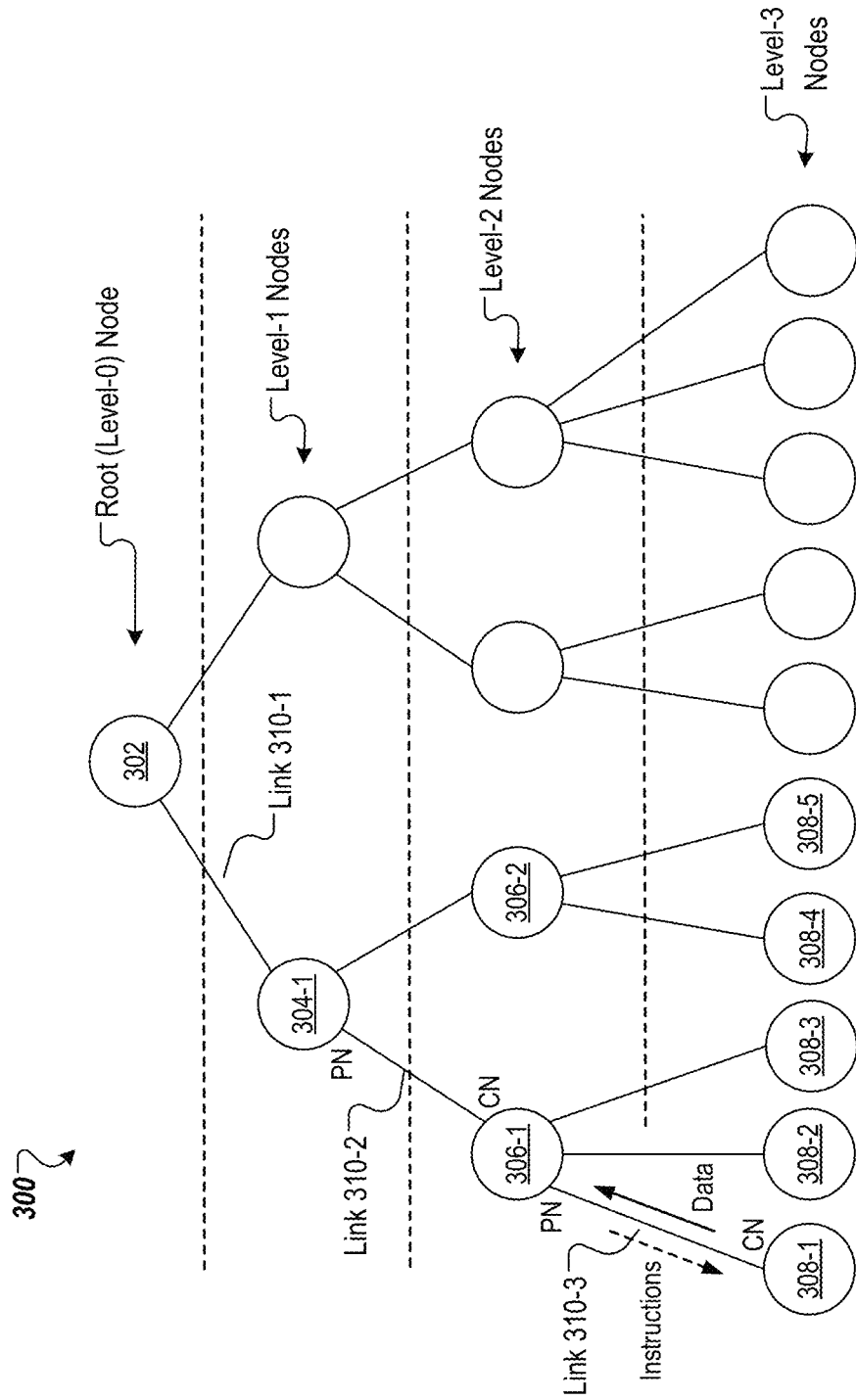
FIG. 3 illustrates an example node topology of a wireless network, according to some implementations.

FIG. 3 illustrates an example node topology 300 of a wireless network, according to some implementations. Node topology 300 may describe a Bluetooth network, a BLE network, a Wi-Fi network, or another type of wireless network. Node topology 300 may include any number of nodes configured to pass data to other nodes (or to associated devices), to process data, to combine data, etc. The nodes may also be configured to communicate with respective associated devices. For example, each (or at least some) nodes may be associated with (or may manage or control) a measuring device. A root (central) node of the network may be configured to communicate with a device that controls the entire wireless network. In some implementations, the wireless network may have multiple root nodes 302 (not shown in FIG. 3), one or more of which may be back-up root nodes or nodes having the same network status and rights to control the network. FIG. 3 depicts a primarily binary tree topology, with each node communicating with one node of a higher level and multiple nodes of a lower level, but aspects of this disclosure may be applied to other topologies, including other tree topologies, topologies that are not trees, such as bus topology, star topology, ring topology, and the like. A node may be any device supporting wireless connectivity and functionality (e.g., capability of receiving, sending, and/or relaying data), such as a desktop computer, laptop computer, a tablet, a phone, a smart TV, lighting, or other device, an appliance, a controller, a component of a security system, a purpose-built device, or any other type of network device.

Node topology 300 includes a number of nodes, arranged in layers, connected by communication links 310-$j$. In some implementations, nodes of the network (e.g., all nodes, nodes of several layers, etc.) are configured to control (or communicate with) associated devices. In some implementations, each node of the network is associated with a device for monitoring conditions of a cell of a battery of an electric vehicle. Root node 302 may be (or be associated with) a central or control device. The central or control device may control parameters of the wireless network, communication schedule between the nodes, may perform a final aggregation of data collected by (or at a direction) of various nodes, etc. Root node 302 is communicatively coupled with level-1 nodes 304. (Level-$j$ nodes may be nodes that are removed from root node 302 by $j$ communication links.) In some implementations, a node (of a particular link 310-$j$) that is closer to root node 302 (e.g., level-($j-1$) node) may be a parent node in control of link 310-$j$, e.g., may be the device that dictates timing, interval, frequency, etc., of communications occurring via link 310-$j$. One or more nodes (of the same link 310-$j$) that are farther away (e.g., level-$j$ nodes) from root node 302 may be child nodes that follow the instructions of the parent node as to the communication timing, frequency, etc., occurring via link 310-$j$.

In a tree scatternet topology, a level-$j$ node may be a parent node to one or more level-($j+1$) nodes and also a child node to a level-($j-1$) node. Any node that has both a parent node and at least one child node may be referred herein as an intermediate node (intermediate device). For example, any node except the root node and the terminal nodes of the ultimate level-$n$ nodes may be intermediate nodes. Topology 300 illustrates schematically such a scatternet topology (scatternet network) that includes a root node 302, and nodes of several layers below root node 302, namely level-1 nodes 304-$k$, level-2 nodes 306-$k$, and level-3 nodes 308-$k$. It should be understood that any number of levels may be included in a tree topology of nodes. In some implementations, nodes of the lowest layer (e.g., level-3 nodes 308-$k$) may be associated with devices for performing a synchronous action, such as manipulating a device, taking a measurement, etc. Segments of data (e.g., results of measurements) may be passed by level-3 nodes 308-$k$ to their respective parent nodes, e.g., level-2 nodes 306-$k$. Level-2 nodes 306-$k$ (or their associated devices) may act as aggregators of the segments of data received from level-3 nodes 308-$k$. Nodes 306-$k$ and may themselves be associated with devices that perform a synchronous action (e.g., the same synchronous action as being performed by one or more level-3 nodes 308-$k$). Accordingly, nodes 306-$k$ may generate additional data segments that are added to the aggregated data. The aggregated data may then be passed to level-1 nodes 304, which may act as aggregators for the data from level-2 nodes 306 and level-3 nodes 308. For example, node 306-1 may be a parent node (PN) to nodes 308-1, 308-2, and 308-3 and a child node (CN) to node 304-1. The data may be collected by node 306-1 from upstream nodes 308-1, 308-2, and 308-3, added to, aggregated (and, optionally, modified or otherwise processed) and provided to the downstream node 304-1. This process may continue until the data generated during (or in conjunction with) the synchronous action is delivered to root node 302. The specifics of data generation, communication, aggregation, etc., may be determined by a particular application, network topology, wireless communication protocol, or the like. In some implementations, some information may propagate in the opposite direction (as indicated by the dashed arrow). The information may include time synchronization data packets, time stamps, target times for the synchronous actions, instructions how the synchronous actions are to be performed, and so on.

In some implementations, instructions in topology 300 may flow from root node 302 to nodes of lower levels, e.g., a control device associated with root node 302 may determine communication timings, frequencies, intervals, etc., for the communication connections of the network, and may communicate instructions indicating these parameters to the nodes of the network via links various links 310-$j$ between the nodes. As used herein, for the sake of nomenclature, the direction from a given node toward the root node 302 may be referred to as the downstream direction and the direction away from the root node 302 may be referred to as the upstream direction. It should be understood, however, as explained above, that information may flow in both directions over each link. In some implementations, the data may be collected in the course of measuring conditions proximate to an associated device, such as properties of a battery cell, properties measured by a medical sensor, industrial sensor, laboratory sensor, and the like.

In some applications, the timing and alignment of data transmissions may be important since misaligned transmissions can cause delays in data transfer up the tree of node, increase latency and power loses in retransmissions due to data collisions. To enable optimal data transmission (and/or forwarding) from lower level nodes to higher level nodes, the optimal alignment in this tree of nodes may first be established. In particular, timing of the connections between a given node and its child nodes may be just before the connections to the parent node(s). A suitable gap (time delay) between parent and child connections may be used to allow for communication window widening and data aggregation.

The advantages of such placement of transmission may include (but are not limited to): low latency of data transfer, reduction in power due to avoidance of collisions, lower packet error rate. In a given topology, the connections may be established starting from higher level links (e.g., from the root node) followed by lower level links. Optimal arrangement of the timing of transmissions is facilitated by each intermediate being in control of connections to its child nodes and following its parent in with respect to the connection to that parent.

In BLE networks, the Connection Update procedure can be used to change (e.g., improve) the timing of the connection. The Connection Update procedure establishes the timing of a first connection event that follows the Connection Update, which determines the timing of subsequent connection events. The use of the Connection Update allows for reacquisition of the target placement in case a connection dropped and has to be recreated.

Figure 4:
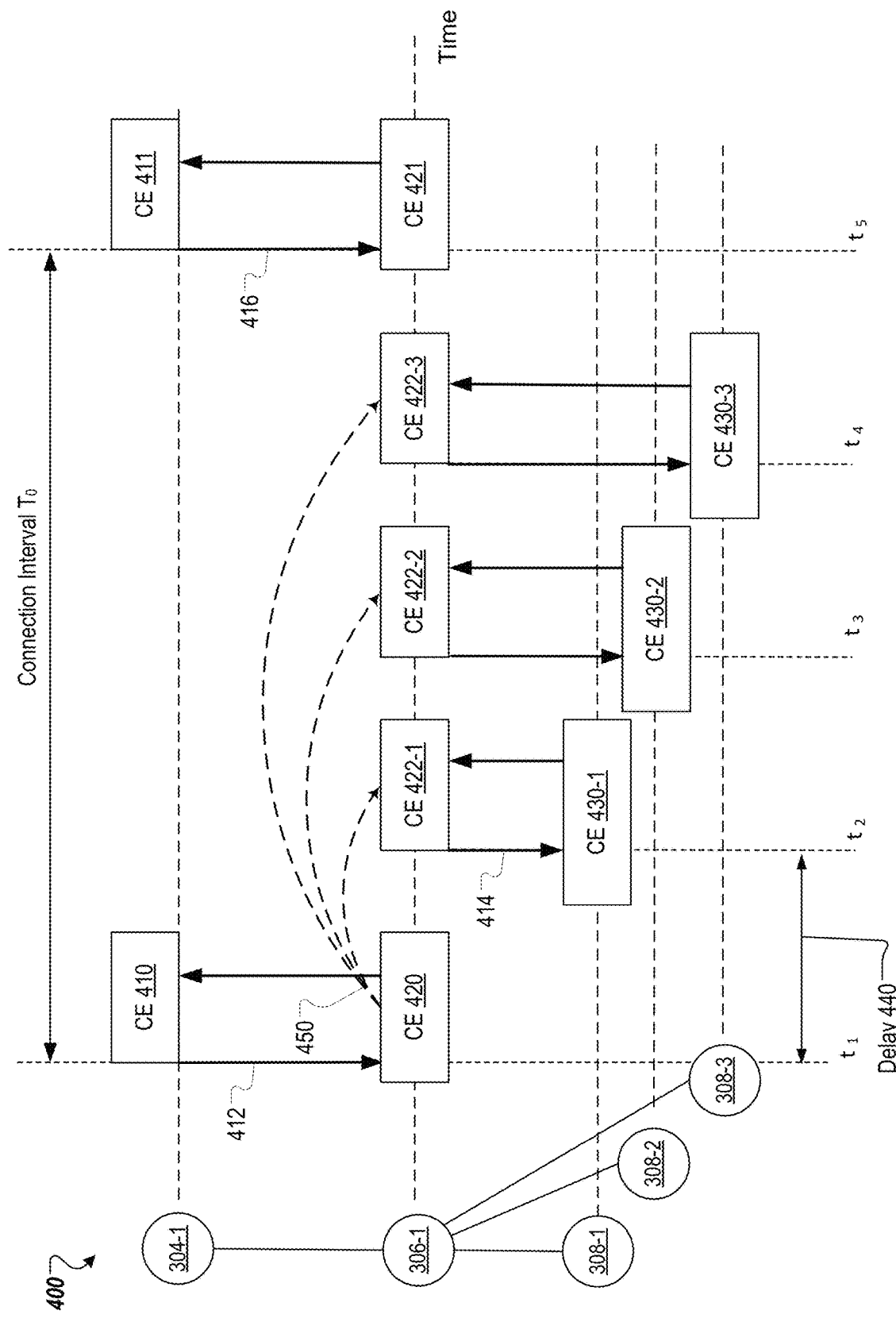
FIG. 4 illustrates an example communication scheme for communications between nodes of multiple layers of a wireless scatternet network, according to some implementations.

After the optimal timing of connections is established, link coupling procedure may be used to maintain this timing. At each intermediate node the connection to the parent is the leader link and the connections to the child nodes are the follower links. Correspondingly, whenever the intermediate node is synchronized with the parent node, the timing of the connections to the child nodes are immediately adjusted to conform to this optimal offset. Since parent devices at each level adjust their respective clocks to be in fixed alignment with their own parent, the child nodes may factor in the clock adjustment of their parent nodes by using a larger window widening factor, e.g., with each subsequent layer of nodes having an increased window widening. Such progressive window widening allows to mitigate drift compounding of clocks in multiple layers. The additional window widening may add an amount to the connection time interval. In some implementations, this may be mitigated by using shorter connection intervals and/or using more accurate clocks (e.g., to minimize window widening). FIG. 4 illustrates an example communication scheme 400 for communications between nodes of multiple layers of a wireless scatternet network, according to some implementations. Communication scheme 400 is illustrated using connections between node 304-1 of level-1, node 306-1 of level-2, and nodes 308-1, 308-2, and 308-3 of level-3 (as depicted in FIG. 3), but the described communication scheme applies to communications of nodes of any three adjacent layers of any network having an arbitrary number of layers of nodes. Node 306-1 has a parent node 304-1 and three child nodes 308-1, 308-2, and 308-3. A device associated with node 304-1 may control the communication connection between node 304-1 (and its associated device) and node 306-1 (and its associated device). For example, communication between node 304-1 and node 306-1 may be dictated by a clock of node 304-1 (or its associated device). The parameters (e.g., communication frequency, communication timing, connection interval, etc.) of the communication connection between node 304-1 and node 306-1 may be determined by node 304-1, by the root node 302 (control node, control device) of the network, or by another device that controls communication scheme 400. In some implementations, the parameters of the communication connection may be determined by multiple devices; for example, some parameters may be determined by the control device and some parameters may be determined by the device associated with node 304-1. For example, a range of possible parameters may be provided by the control device and the specific values of these parameters (within the provided range) may be generated by node 304-1. Likewise, node 306-1 may control the communication connection between node 306-1 and child nodes 308-1, 308-2, and 308-3, e.g., in a similar fashion to that described above in connection with communications between nodes 304-1 and 306-1.

At time $t_1$, node 304-1 may open a connection event (CE) 410 to communicate data to node 306-1 and may receive data from node 306-1. CE 410 may be opened at a time determined in view of a clock value of the device that controls the entire wireless network, such as the root node (node of level-0) using, e.g., the techniques of cascade clock synchronization described above in relation to FIG. 2. In particular, a clock of node 304-1 (which is used to start CE 410) may be synchronized relative to the clock of the root node. Node 306-1 may open its CE 420 (for communication with node 304-1) prior to the start of CE 410. This implements a widened connection event, to assist in accounting for clock drift, jitter, etc. In some implementations, all communication connections within a network (e.g., each link 310-$j$ of FIG. 3) may have the same period of communication (e.g., $T_0$). In some implementations, different links 310-$j$ may be used with a different period between communications. For example, nodes 308-1, 308-2, and 308-3 may communicate with node 306-1 every connection interval $T_0$, but node 306-1 may communicate with node 304-1 every two connection intervals (period $2T_0$) In some implementations, all links may be used to communicate during every connection interval $T_0$.

Within a single connection interval $T_0$, node 306-1 may communicate with each of its child nodes 308-1, 308-2, and 308-3. More specifically, node 306-1 may open, at a time $t_2$, as measured by a clock of node 306-1, a CE 422-1 to communicate with child node 308-1. Child node 308-1 may have opened a widened CE 430-1 at a time prior to time $t_2$. A message received by node 308-1 during CE 430-1 from node 306-1 may be used to synchronize (or re-synchronize) the clock of node 308-1 to that of node 306-1, as described above in relation to FIG. 2 or using similar techniques. Similarly, node 306-1 may open additional CEs to communicate with other child nodes of node 306-1. For example, node 306-1 may, at time $t_3$, open CE 422-2 to communicate with child node 308-2 and, at time $t_4$, open CE 422-3 to communicate with child node 308-3. Each of the nodes 308-2 and 308-3 may open a widened communication interval, e.g., CE 430-2 and CE 430-3, respectively. In some implementations, various CEs may be non-overlapping in time so that there is no cross-talk or interference when different communication links are being used. In some implementations, time delays $t_2$-$t_1$, $t_3$-$t_1$, and $t_4$-$t_1$ may be established, managed, and enforced by node 306-1 (or a device associated with node 306-1). These fixed time delays may be enforced by the techniques of link coupling.

Communication scheme 400 of FIG. 4 may be extended to include additional child devices, levels of nodes, etc. After expiration of connection interval $T_0$, e.g., at time $t_5 = t_1 + T_0$, node 304-1 may open a new CE 411, node 306-1 may open a corresponding CE 421, and some or all communications illustrated in FIG. 4 may be repeated.

In some implementations, as indicated with dashed arrows 450, timing delays between connection events may be enforced to maintain relative connection timings. During CE 410, node 304-1 may transmit a message 412 to node 306-1. Node 306-1 may be configured to synchronize time (or update time synchronization) with node 304-1 upon reception of message 412 (e.g., upon the hardware of node 306-1 detecting message 412, its access code, header, etc.). Subsequently, node 306-1 may open CE 422-1 and transmit a message 414 to node 308-1. Node 308-1 may be configured to generate a synchronized time with node 306-1 upon reception of message 414. As a result, any adjustment of clock of node 306-1 may be passed onto child node 308-1 by enforcing the time of transmission of message 414 to child node 306-1 based on the periodically adjusted (time-synchronized) clock of node 306-1.

To accommodate de-synchronization of clocks of node 304-1 and node 306-1 that has occurred since the last synchronization event (e.g., that has occurred during the latest connection interval $T_0$), node 306-1 may open CE 420 for communication with node 304-1 before an expected time of communication $t_1$. Node 304-1 may open CE 410 at the scheduled communication time according to the clock of node 304-1. Node 306-1 may establish a synchronized time based on the arrival time of message 412 and/or other information, such as a connection event counter (maintained by node 306-1 or communicated with message 412), connection event interval, time stamp, etc. Node 306-1 may be scheduled to subsequently open CE 422-1 for communication with node 308-1. Node 306-1 may enforce a delay 440 (e.g., $t_2-t_1$) of a target duration to maintain the target spacing between connection events, e.g., enforcing delay 440 between reception by node 306-1 of message 412 from node 304-1 and opening of CE 422-1 for communication with node 308-1 (e.g., the time of transmission of message 414). Node 306-1 may similarly enforce target time delays $t_3-t_1$, $t_3-t_1$ for communications with other child nodes 308-2 and 308-3. Each of nodes 308-1, 308-2, and 308-3 may have one or more upstream child nodes (not shown in FIG. 3 and FIG. 4) and may similarly enforce time delays (and facilitate time synchronization) for the upstream child nodes using the same techniques as described above.

Wireless Network Data Latency Management

In some aspects of the present disclosure, a wireless network of nodes is configured to collect data at a central processing device from devices associated with the nodes of the network. Reducing data latency (e.g., decreasing the time it takes to aggregate and transmit data from the nodes of the network to the central processing device) may be advantageous. In a topology of wireless nodes, efficient placement in time of connections between nodes may be arranged to optimize flow of data to the central device. The placement of connections in time may reduce collisions between connections involving the same device, connections involving exclusively different devices, etc. Other arrangements, such as placing connections in time such that data flow (e.g., instructions) from a central node down a tree topology to the other nodes of the network are within the scope of this disclosure. In some embodiments, connections may be placed to avoid collisions and minimize data latency. Connections placement may enable data collection from all the nodes of a network each connection interval (e.g., in a BLE network). Efficient connection placement may also improve reliability and reduce power consumption.

Figure 5:
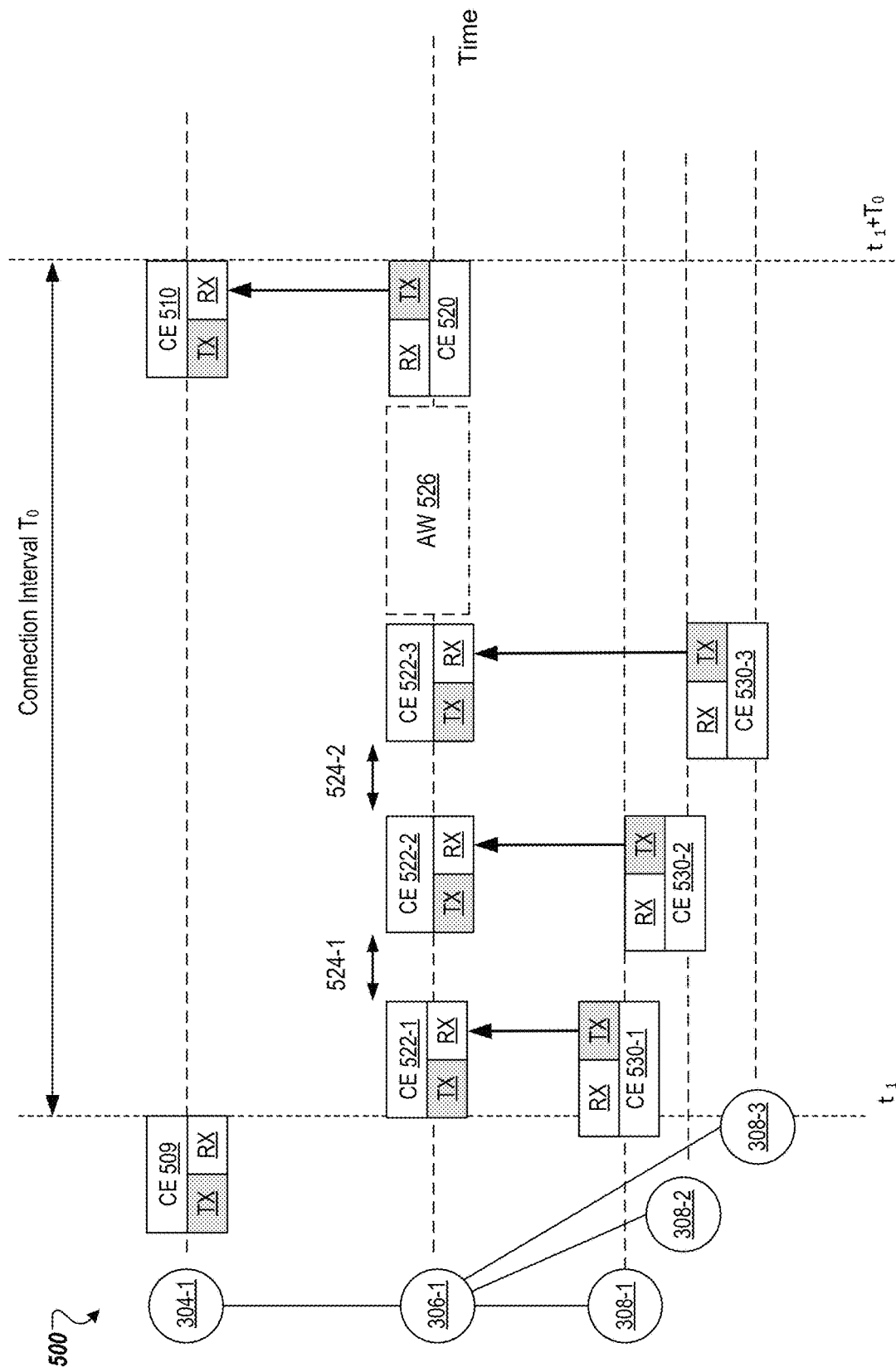
FIG. 5 illustrates an example communication scheme that optimizes downstream data flow in a wireless network, according to some implementations.

FIG. 5 illustrates an example communication scheme 500 that optimizes downstream data flow in a wireless network, according to some implementations. In communication scheme 500, connection events may be arranged by a control device (e.g., a root/central node). In some implementations, the root node or a device associated with the root node may be configured to aggregate data from many (or all) nodes of the wireless network, to perform analysis of the aggregated data, and so on. In some implementations, timing of connection events may be arranged to optimize data flow in a different direction (e.g., upstream), using analogous (e.g., inverted) communication scheme, compared to the communication scheme 500. FIG. 5 illustrates connections between the same nodes 304-1, 306-1, 308-1, 308-2, and 308-3 as previously described in conjunction with FIG. 3 and FIG. 4. Nodes 308-1, 308-2, and 308-3 may communicate with node 306-1 at times dictated by node 306-1. In some implementations, node 306-1 receives and passes on to nodes 308-1, 308-2, and 308-3 instructions from node 304-1 with the timing (delays) of various connection events.

As depicted, at time $t_1$, node 306-1 may open reception (RX) window of CE 522-1 to collect data from node 308-1. Prior to collecting data, as part of RX window of CE 522-1, node 306-1 may also provide instructions and other information to node 308-1. Node 308-1 may open transmission (TX) window of CE 530-1 for communication with node 306-1 prior to time $t_1$, as described above, in conjunction with FIG. 3 and FIG. 4. After the data is communicated from node 308-1 to node 306-1, node 306-1 may close CE 522-1 and may enter a period of silence, e.g., interval 524-1, before opening the next CE 522-2 for communication with node 308-2. Node 308-2 may similarly open CE 530-2 prior to the scheduled CE 522-2 and communicate data during an overlapping portion of CE 522-2 and CE 530-2. After the data is communicated from node 308-2 to node 306-1, node 306-1 may close CE 522-2 and enter a period of silence, e.g., interval 524-2, before opening the CE 522-3 for communication with node 308-3. The periods of silence may allow to accommodate widening of CE 530-1 and CE 530-2. Node 308-3 may open CE 530-2 prior to the scheduled CE 522-2 and communicate data during an overlapping portion of CE 522-3 and CE 530-3. The intervals 524-1 and 524-2 provide a degree of flexibility for nodes 308-$k$ to deploy window widening.

In some implementations, after closing CE 522-3, node 306-1 may enter an aggregation window (AW) 526 during which node 306-1 may process data, rearrange data, discard some data, append additional data, aggregate data, package data, and so on. The aggregated and packaged data may then be transmitted to node 304-1. For example, node 304-1 may open RW 510 to receive data from node 306-1. Node 306-1 may open CE 520 and transmit data to node 304-1.

In some implementations, all RX windows may have the same (first) duration and all TX windows may have the same (second) duration. In some implementations, to account for a possible accumulation of clock errors in consecutive layers of nodes, upstream reception windows may be made progressively wider with each layer of nodes.

The same process may be followed by other nodes of the wireless network. For example, node 306-1 may be one of multiple child nodes communicating with node 304-1. Correspondingly, CE 510 may be a part of a sequence of CEs opened for multiple child nodes (node 306-1 being just one among those child nodes). Numerous other devices (not shown in FIG. 5) may be present in the wireless network. Each of nodes (devices) 308-1, 308-2, and 308-3 may have additional child devices. Similarly, node 304-1 may have a parent node further downstream the wireless network. Using the same principles of arrangement of transmission and reception windows, data may flow through the entire network (including any number of nodes) over a single connection interval, with each node communicating data to a downstream node as soon as the data is ready (e.g., obtained and/or aggregated) for transmission.

Figure 6:
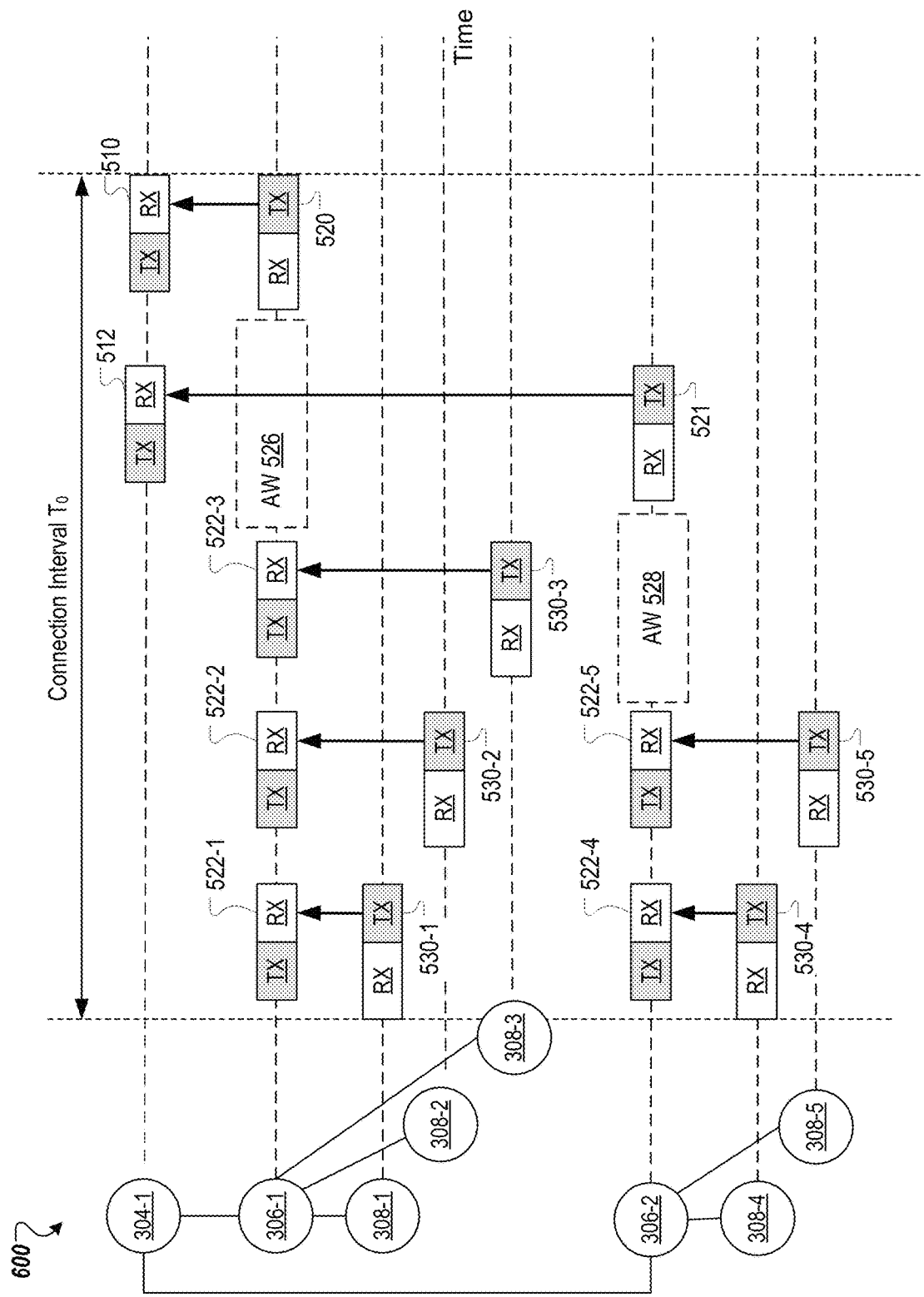
FIG. 6 is a further illustration of the example communication scheme of FIG. 5 that optimizes downstream data flow in a wireless network, according to some implementations.

In some implementations, communication scheme 500 may be used to transfer data from a number of source nodes to a number of destination nodes. Destination nodes may be configured to obtain information from the devices of the wireless network for further processing. In some implementations, a wireless topology may be optimized for information delivery in the opposite direction, e.g., away from a central node, in which case downstream and upstream designations may be reversed. For example, if the information delivery is optimized in the opposite direction (from root node to higher-level nodes), communication scheme 500 may still be used with the directions of arrows and the direction of time axis in FIG. 5 reversed FIG. 6 is a further illustration of an example communication scheme 500 of FIG. 5 that optimizes downstream data flow in a wireless network, according to some implementations. In addition to node 306-1, FIG. 6 illustrates operation of another level-2 node 306-2 of FIG. 3 and two child nodes 308-4 and 308-5 of node 306-2. As illustrated in FIG. 6, a communication between node 308-4 (node 308-5) and node 306-2 may occur concurrently (with a complete or partial overlap) with the communication between node 308-1 (node 308-2) and node 306-1. After aggregating, during an AW 528, the data collected from nodes 308-4 and 308-5, node 306 may open TX window 521 for communication of the aggregated data to node 304-1, which opens the corresponding RX window 512. As illustrated in FIG. 6, communications from nodes 306-1 and 306-2 to node 304-1 occur at different times, separated by a period of silence. As illustrated in FIG. 6, communication between node 306-2 and node 304-1 may occur while node 306-1 is aggregating data (AW 526).

The arrangement of communications illustrated in FIG. 6 improves efficiency of data collection allowing a shorter total connection interval while still ensuring that the data from multiple (or all) nodes is communicated concurrently while no two upstream nodes are communicating with the same downstream node at the same time. Analogous timing techniques may be applied to communication links between nodes of any levels and to topologies of an arbitrary size (e.g., to wireless network having n layers of nodes).

The timing of data communication illustrated in FIG. 6 is such that multiple communications between different pairs of nodes may occur simultaneously. In a variety of applications, the nodes of the wireless network may be located within a limited volume (e.g., a car battery or a medical sensing apparatus) and may interfere with each other's communications when the same communication frequencies are being used. Methods of frequency multiplexing may be used to address such situations and reduce the amount of interference, as described in more detail below.

Communication Interference Management

In one aspect of the present disclosure, interference of wireless communication between devices of a wireless network is managed. In some embodiments, connection events between nodes are placed to avoid collisions in time. In some embodiments, some connection events in a network may be placed at the same time. For example, communication between a first node of the network and a second node of the network may overlap in time with communication between a third node of the network and a fourth node of the network. Communication channels (e.g., wireless communication frequencies) may be allocated to avoid collisions in frequency. Communication channels may be allocated to avoid overlap in frequency with signals originating outside the wireless network, e.g., external interference.

Figure 7:
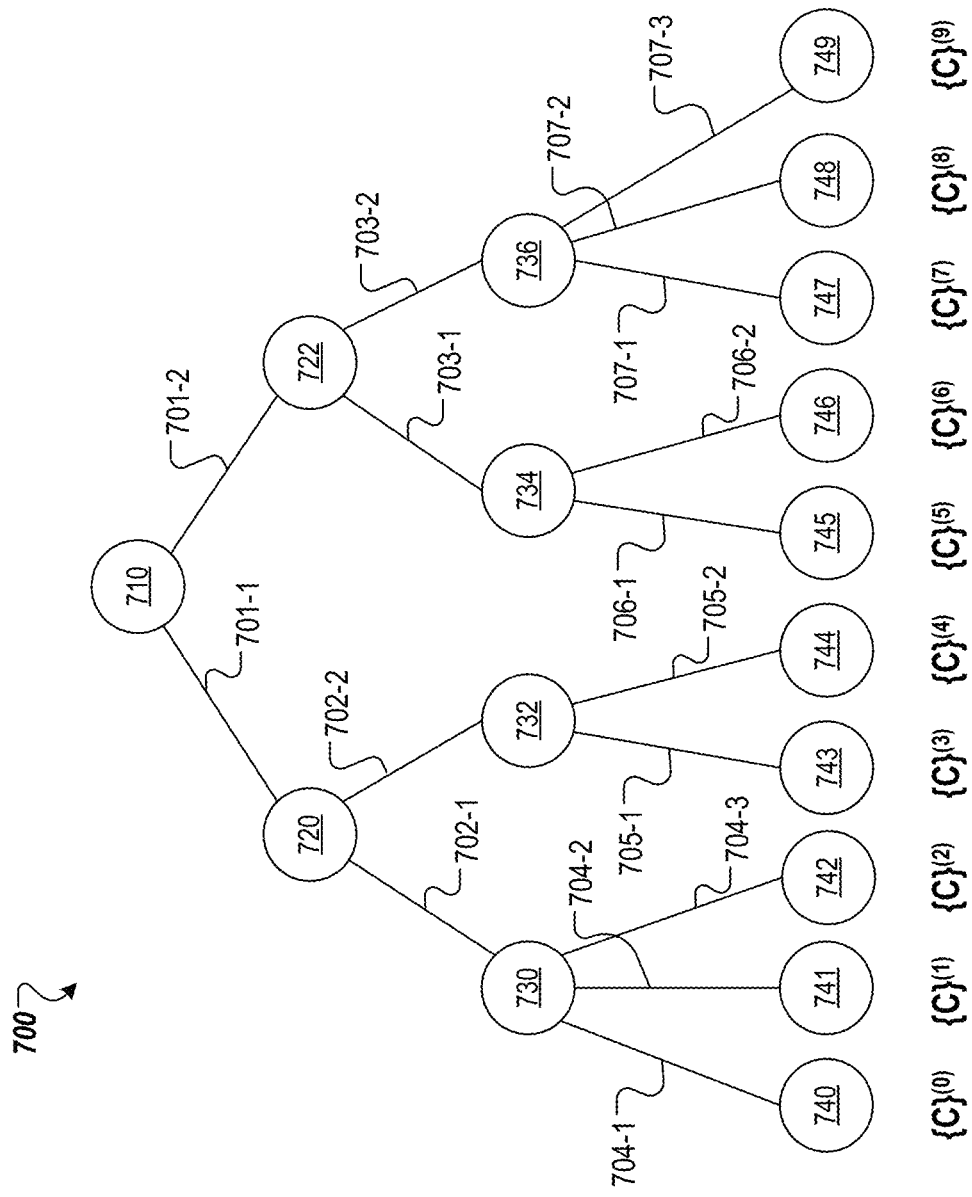
FIG. 7 is an illustration of an example channel multiplexing scheme that reduces interference during data communication in a wireless network of nodes, according to some implementations.

FIG. 7 is an illustration of an example channel multiplexing scheme 700 that reduces interference during data communication in a wireless network of nodes, according to some implementations. The wireless network of nodes may have a number of available wireless communication channels (WCCs) to be assigned to different wireless links. For example, a Bluetooth Low Energy network may have 40 WCCs having width of 2 MHz each, with 37 WCCs available to communicate data and 3 WCCs used for advertising. In the channel multiplexing scheme 700, links that are not used concurrently may utilize the same WCCs, as no interference is likely to occur. For example, since links 701-1 and 701-2 are used at different times (are time-multiplexed), links 701-1 and 701-2 may share the same WCCs for wireless communications. Similarly, any links that are numbered with the same first three digits (e.g., links 703-1 and 703-2) may communicate using the same WCCs. On the other hand, as illustrated in FIG. 6, some of links 704-*j* may be used concurrently with at least some of links 705-*j* (706-*j*, 707-*j*, etc.). Such links may be assigned different WCCs, to avoid or reduce interference.

In some implementations, a control device (e.g., node 710 or a device associated with node 710) may transmit a communication schedule to various nodes of the network. The control device may generate a schedule that assigns both the communication (transmission and reception) windows to the nodes (as described in more detail above) and the WCCs to various wireless links between the nodes. For example, each link may be assigned a set of WCCs that may be utilized by that link. In some implementations, the links that operated concurrently may be assigned different WCCs whereas the links that operate at different times (e.g., links that communicate with the same downstream node) may be assigned the same set of WCCs. A set of WCCs may have one or more WCCs depending on the total number of nodes in the network, with one or two WCCs per link in the instances of a large number of nodes and several or more WCCs for smaller networks. In some implementations, each of the nth level nodes may be assigned a different set of WCCs, e.g., node 740 may be assigned a set $\{C\}^{(0)}$, node 741 may be assigned a set $\{C\}^{91)}$, and so on, with node 74X assigned a set $\{C\}^{(X)}$.

Assigning multiple WCCs to a given link may improve resilience of that link to interference or noise, in case an outside wireless device begins to communicate using one of the assigned frequencies. Accordingly, in some implementations, some sets of WCCs may be partially or fully overlapped. For example, since links 707-*j* may be used at different times, some of the sets $\{C\}^{(7)}$, $\{C\}^{(8)}$, and $\{C\}^{(9)}$ may have common channels. In some implementations, sets $\{C\}^{(7)}$, $\{C\}^{(8)}$, and $\{C\}^{(9)}$ may be the same. Likewise, sets $\{C\}^{(0)}$, $\{C\}^{(1)}$, and $\{C\}^{(2)}$ may be the same but different from sets $\{C\}^{(7)}$, $\{C\}^{(8)}$, and $\{C\}^{(9)}$ (and other sets).

Downstream links may have a larger variety of assigned WCCs, by virtue of having fewer nodes in the downstream layers. For example, if link 702-1 is not used simultaneously with links 704-*j*, link 702-1 may be assigned any WCCs of the union $\{C\}^{(0)} \cup \{C\}^{(1)} \cup \{C\}^{(2)}$ (including all WCCs of this union) whereas link 702-2 may be assigned any WCCs of the union $\{C\}^{(3)} \cup \{C\}^{(4)}$. Moreover, if links 702-1 and 702-2 are not used simultaneously, each of links 702-1 and 702-2 may be assigned any (or all) WCCs of the larger union $\{C\}^{(0)} \cup \{C\}^{(1)} \cup \{C\}^{(2)} \cup \{C\}^{(3)} \cup \{C\}^{(4)}$. Such assignment of WCCs may extend through all downstream nodes, with the root node 710 being assigned any (or all) WCCs from the union of all sets $\{C\}^{(j)}$.

In some implementations, for additional protection against noise and interference from interloping signals of an adjacent wireless communication channel (e.g., having close frequency) different sets of WCCs may be separated (spaced) by one or more unassigned WCCs. For example, in the wireless network shown in FIG. 7, available WCCs $C_1 \ldots C_{37}$ (assuming a BLE network, for concreteness) may be assigned as follows:

$C_1 \ldots C_8$: links 704-1, 704-2, and 704-3;
$C_9$ and $C_{10}$: unassigned;
$C_{11} \ldots C_{18}$: links 705-1 and 705-2;
$C_{19}$ and $C_{20}$: unassigned;
$C_{21} \ldots C_{28}$: links 706-1 and 706-2;
$C_{29}$: unassigned;
$C_{30} \ldots C_{37}$: links 707-1 and 707-2.

As a result, any two pairs of nodes that may be in simultaneous communication are separated with at least one (and, often, two) unassigned spacer WCCs. The above assignment is exemplary as any other spaced assignment of WCCs may be used instead. For example, a number of WCCs assigned to wireless links may be lower while the number of unassigned spacer WCCs may be higher.

At different times, different WCCs may be selected for communication by a particular node, from a set of WCCs assigned to that node. Selection of WCCs may be performed by a parent node, e.g., node 734 may select a WCC from a set $\{C\}^{(6)}$ assigned to node 746, by root node 710, or by any other downstream node that is between node 734 and node 710 (e.g., node 722). Selection of WCCs may be communicated in instructions transmitted by parent nodes, and may be effective starting from the next, or any subsequent, communication. Selection of WCCs may by dynamic, in some implementations, and may be based on the amount of measured external interference/noise. More specifically, some (or all) nodes of the network may be configured to detect potential interference, e.g., by detecting energy present within a particular frequency band, which may include the WCC currently being used by the node for communications. The metrics used to evaluate the quality of each specific link may include received signal strength indicator (RSSI), signal-to-noise ratio (SNR), which may be the RSSI of the link adjusted by the amount of noise detected in the channel, or any other acceptable metric.

In some implementations, a node in control of a wireless link (e.g., a parent node or root node 710) may receive information from one or more nodes of the network and may remove a specific WCC (or multiple WCCs) from subsequent communications, at least temporarily, until the environment of the wireless network changes. For example, a node may send a message to the parent node indicating that a certain WCC or WCCs are experiencing interference, reduced RSSI/SNR, etc. The message can propagate through the network and reach a control device (e.g., root node 710), which may then remove the corresponding WCC(s) from subsequent communications. The control device may then distribute updated WCC information all (or the affected) nodes of the wireless network. In some implementations, the control device may perform a complete reassignment of WCCs if certain channels are underperforming. For example, if 15 highest-frequency BLE channels $C_{23} \ldots C_{37}$ are consistently having low SNR over a period of time, the control device may reassign the remaining channels $C_1 \ldots C_{22}$ among the nodes of the network and maintain the channels $C_{23} \ldots C_{37}$ unassigned, for the time being (e.g., until the SNR improves).

In some implementations, assignment of WCCs may be random, e.g., based on a pseudorandom sequence of communication frequencies. For example, N available WCCs $C_1 \ldots C_N$ (e.g., supported by network hardware, free from interference, etc.) may be assigned based on a random (or pseudorandom) sequence of numbers $1 \ldots N$. In some implementations, each node may store the same pseudorandom function and may generate the WCCs to be used for communications, without waiting for instructions from the parent node. Each node may be assigned an offset, e.g., number M, into the pseudorandom sequence of WCCs $1 \ldots N$ and may select a WCC for communication as Mth number in the generated sequence. Nodes that communicate concurrently may be given different offsets to ensure that communications of such nodes do not interfere. For example, nodes 741 and 745 may given different offsets whereas nodes 741 and 742 may be given different or the same offsets. As a result, a pre-assigned offsets serve as pointers into the pseudorandom sequence. Since the same pseudorandom sequence may be generated by all nodes, different pointers used by different nodes ensure that concurrently communication nodes do not use the same WCCs.

In some implementations, the offset of each node may be shifted by a time-dependent number, e.g. $M(t)=(M+[t|\tau])$ mod N, where t may be discrete time epoch (such as a value of a connection event counter) and i may be some quantization parameter (e.g., a duration of connection interval, or some other item); the function [x] being the integer part of argument x. In some implementations, the pseudorandom function may have time as an additional input, such that different pseudorandom sequences are generated at different times. In some implementations, the pseudorandom function used to determine assignment of WCCs may include both time and an offset as input parameters. In some implementations, the pseudorandom function may include, in lieu of the offset, an address of the respective node (or an address of the parent of the respective node). In some implementations, the WCCs assigned by a pseudorandom function may be non-contiguous WCCs with spacer channels excluded, as described above.

Methods of Wireless Communication Management

Figure 8A:
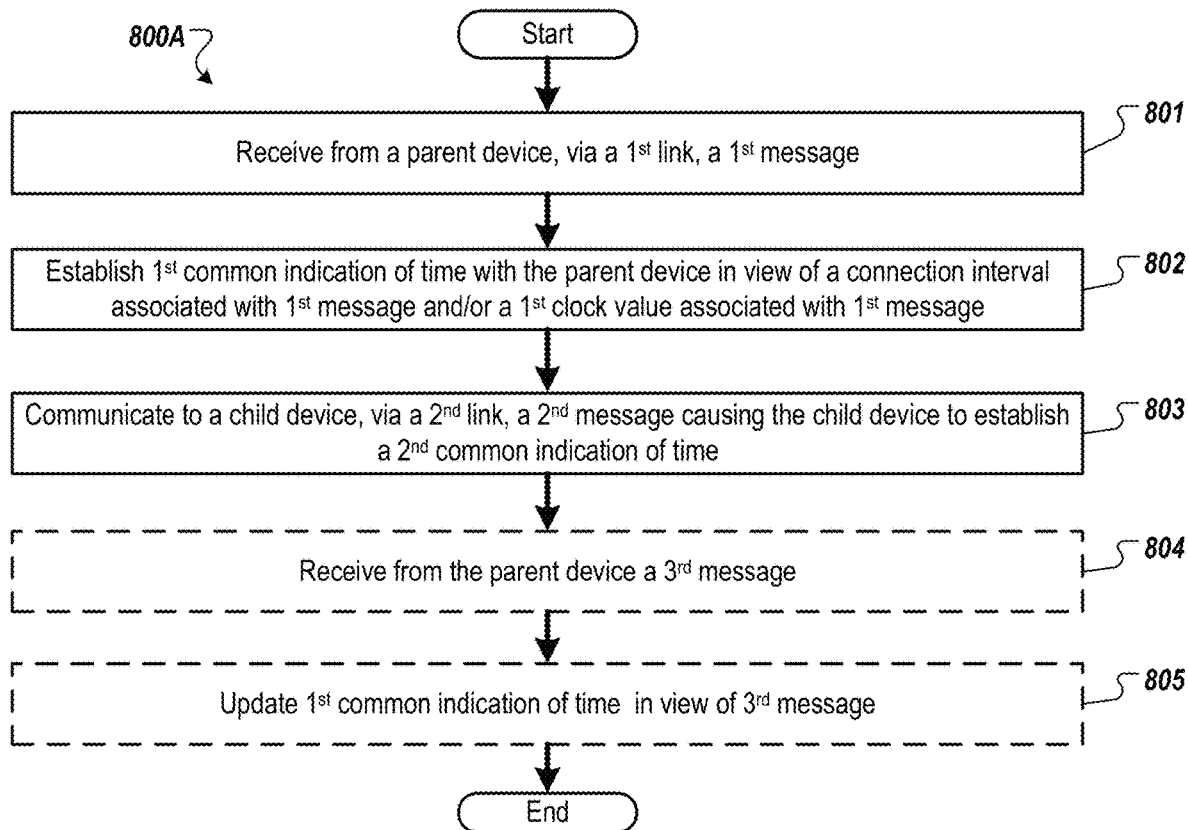
FIG. 8A depicts a flow diagram of an example method of synchronization of devices in a wireless network, according to some implementations.
Figure 8B:
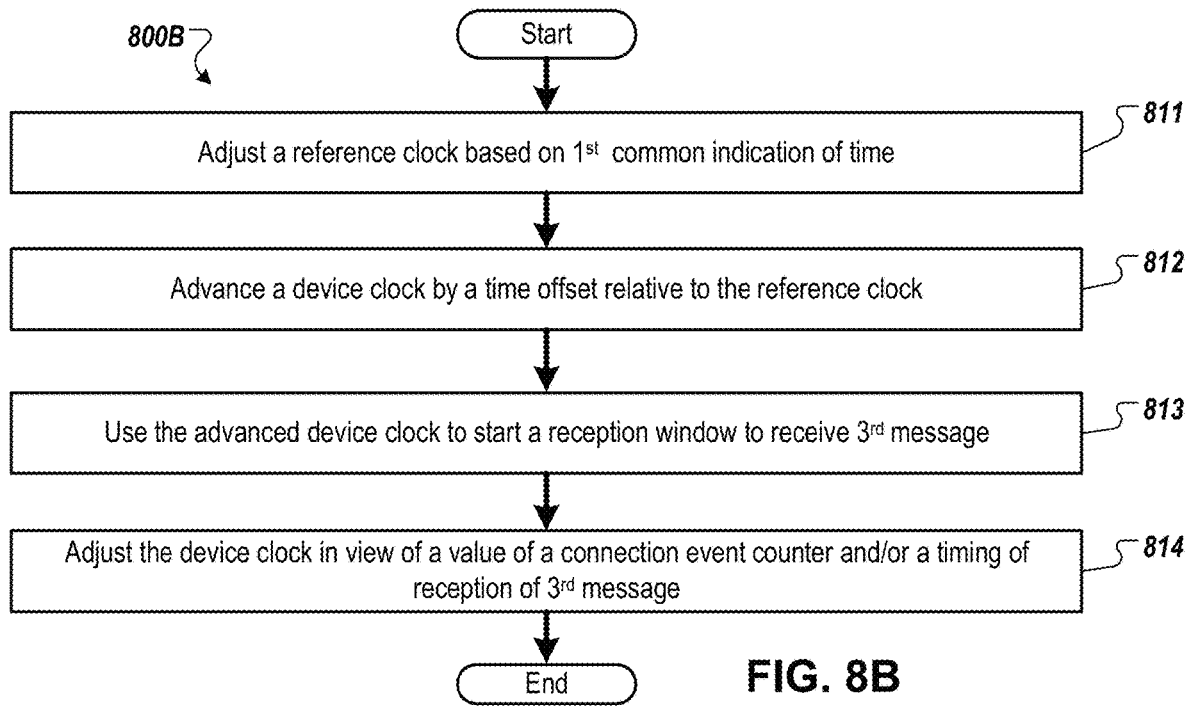
FIG. 8B depicts a flow diagram of an example method of using a common indication of time to open a communication window for communication with a parent network device, according to some implementations.
Figure 8C:
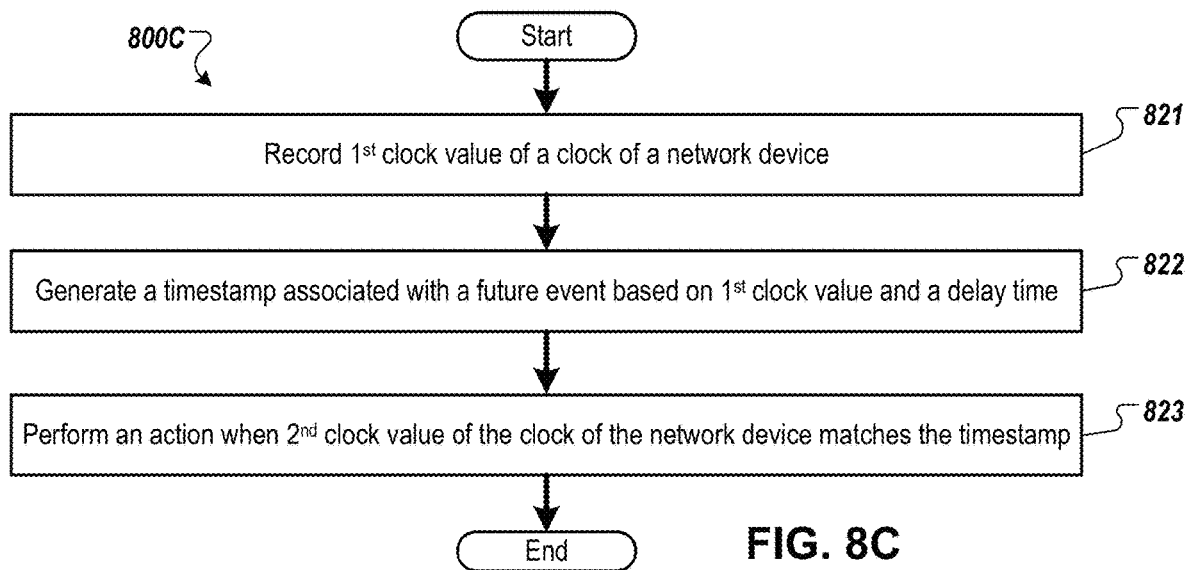
FIG. 8C depicts a flow diagram of an example method of using the common indication of time for performance of a synchronous action, according to some implementations.
Figure 9:
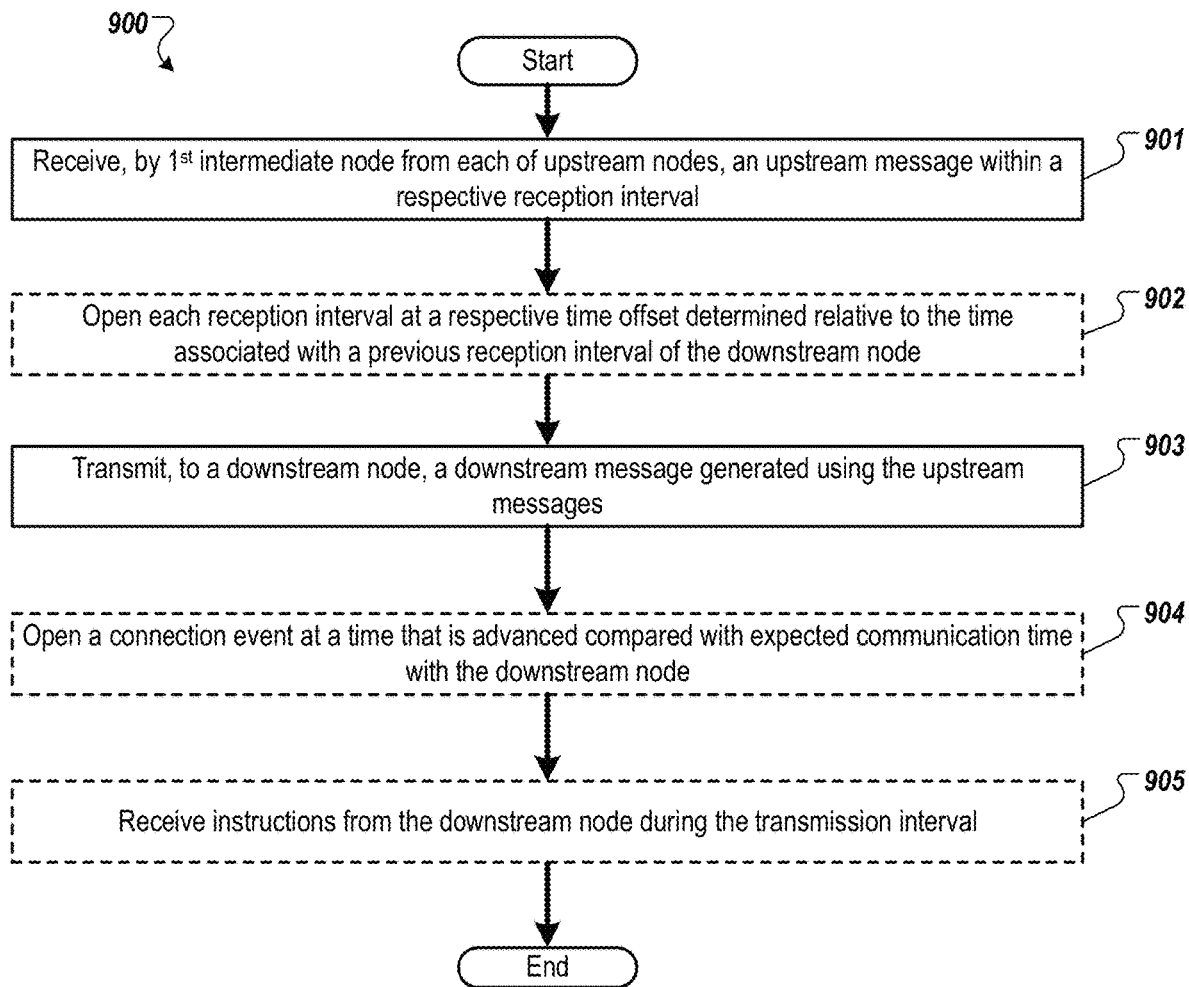
FIG. 9 depicts a flow diagram of an example method of structuring a data flow in a wireless network, according to some implementations.
Figure 10:
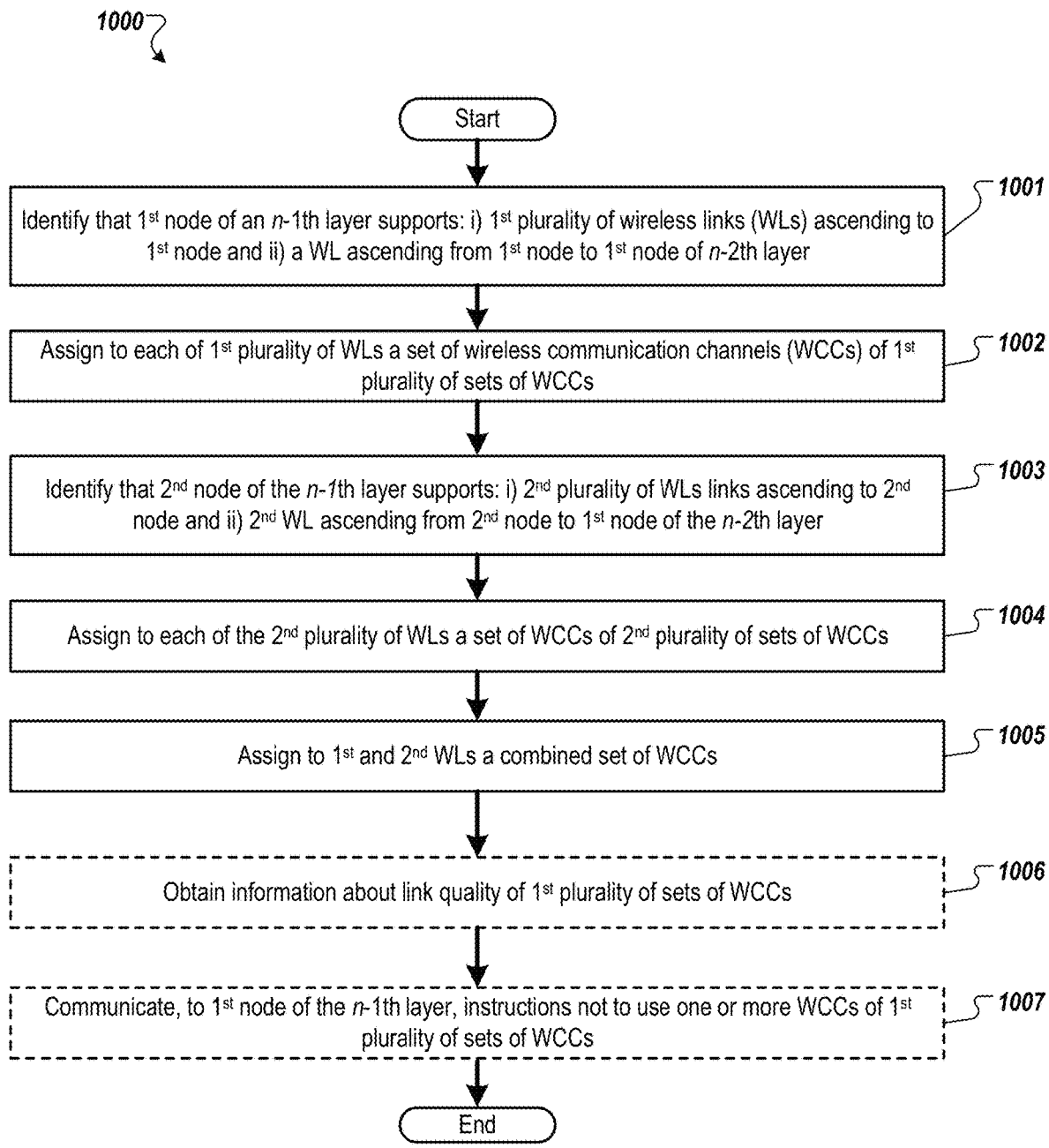
FIG. 10 depicts a flow diagram of an example method of managing communication channels in a wireless network, according to some implementations.

FIGS. 8-10 illustrate example methods 800-1000 of time synchronization, time-multiplexing, and frequency-multiplexing of wireless connection (and their possible variations) in wireless networks. Methods 800-1000 and/or each of their individual functions, routines, subroutines, or operations may be performed by one or more processing units (CPUs, field-programmable gate arrays or FPGA, application-specific integrated circuits or ASICs, finite state machines, and so on) and memory devices communicatively coupled to the processing units of parent device 110, network device 120, child device 124 of FIG. 1, or any devices/nodes illustrated or mentioned in conjunction with FIGS. 2-7, or any combination thereof. In certain implementations, a single processing thread may perform each of methods 800-1000. Alternatively, two or more processing threads may perform each of methods 800-1000, each thread executing one or more individual functions, routines, subroutines, or operations of the methods. In an illustrative example, the processing threads implementing methods 800-1000 may be synchronized (e.g., using semaphores, critical sections, and/or other thread synchronization mechanisms).

Alternatively, the processing threads implementing methods 800-1000 may be executed asynchronously with respect to each other. Various operations of methods 800-1000 may be performed in a different order compared with the order shown in FIGS. 8-10. Some operations of methods 800-1000 may be performed concurrently with other operations. Some operations can be optional.

FIGS. 8A-C depict flow diagrams of example methods of time synchronization and synchronous actions in wireless networks. FIG. 8A depicts a flow diagram of an example method 800A of synchronization of devices in a wireless network, according to some implementations. In a wireless network, devices may have separate internal clocks used to track the passage of time. In some wireless networks, using very accurate clocks may be impractical or prohibitively expensive. In some applications that involve simultaneous measurements or other actions, such as music playing, it may be advantageous to establish a synchronized time throughout the network. Method 800A may be used to establish the synchronized time in networks that have an arbitrary number of devices. In some implementations, establishing the synchronized time may include adjusting clocks of various devices to be in alignment with a particular clock, such as a clock of a central or root node, a clock of a device associated with a specific node of the network, and so on.

At block 801, a network device (e.g., device 306-1 in FIGS. 3 and 4) may receive a first message (e.g., message 412 in FIG. 4) from a parent network device (e.g., node 304-1 in FIG. 3) via a first link of the wireless network (e.g., link 310-2). In some implementations, the wireless network may be a Bluetooth or Bluetooth Low Energy network. The parent network device may be a device in control of the first link. The parent network device may send instructions dictating timing, communication frequency, etc., related to the first link, to the network device. The network device may follow the instructions of the parent network device. In some wireless networks, e.g., wireless mesh networks, parent and child designations may not be static, and roles of devices may change with time. Some wireless networks may be reconfigured into a different topology, e.g., in response to changing conditions or needs. Reconfiguring the network may be performed upon instructions transmitted by the root node or some other node of the network.

At block 802, the network device (e.g., node 306-1) establishes a first common indication of time with the parent device. The first common indication of time may be established in view of at least one of (i) a connection interval associated with the first message or (ii) a first clock value associated with the first message. The first clock value may be a time of arrival of the first message or a time stamp included in the message, e.g., a time stamp corresponding to the transmission or generation (according to the clock of the parent network device) of the first message. The network device may record the time of reception of the first message (according to the clock of the network device) and compare the time of reception to the time stamp to generate a common indication of time with the parent network device (e.g., recording the time difference, adjusting the clock of the network device, etc.). In some implementations, the time of arrival of the first message (rather than the content of the first message) may be used to establish the common indication of time. For example, the network device may be aware of the connection interval $T_0$ and may be configured to multiply the connection event counter by the connection interval (e.g., the amount of time separating connection events that occur between the network device and the parent network device) to determine an expected time of arrival of the first message. In some implementations, the connection interval may be communicated with the first message. In some implementations, the connection interval may have been previously conveyed to the network device, e.g., when the link with the parent network device was first established.

At block 803, method 800A may continue with the first network device communicating to a child network device (e.g., node 308-1 in FIGS. 3 and 4) via a second link (e.g., link 310-3 in FIG. 3) a second message (e.g., message 414 in FIG. 4). The second message may cause the child network device to establish a second common indication of time with the network device. As a result, the common time may be propagated throughout (cascade through) the entire wireless network.

As depicted schematically with optional blocks 804 and 805, the first and second common indications of times in the wireless network may subsequently be updated. In some implementations, indications may be updated periodically (e.g., once per connection interval), upon detection of a clock drift, in preparation for a synchronous action, etc. More specifically, at block 804, the network device may receive a third message (e.g., message 416 in FIG. 4) from the parent network device. The third message may be one of subsequent messages communicated by the parent network device and may have content that is similar to that of the first message (e.g., with the time stamps updated, if applicable). At block 805, the first common indication of time may be updated in view of the third message. For example, a new difference between the expected time of arrival of the third message and the actual time of arrival of the third message (measured by the clock of the network device) may be recorded. The updated first common indication of time may then be used to cause the child network device to update the second common indication of time, e.g., by communicating a fourth message from the network device (e.g., node 306-1) to the child network device (e.g., node 308-1). Any number of child network devices (e.g., nodes 308-2, 308-3) may be synchronized similarly, e.g., by the network device repeating blocks 803 and 805 with communications directed to the respective child network devices.

FIG. 8B depicts a flow diagram of an example method 800B of using a common indication of time to open a communication window for communication with a parent network device, according to some implementations. Method 800B may be performed by a network device that has at least two clocks, referred herein to as a device clock and a reference clock, respectively. At block 811, a network device of a wireless network adjusts the reference clock based on a common indication of time with a parent network device. The reference clock may be a clock internal to the network device. The common indication of time may have been established using any of the implementations described in conjunction with method 800A or similar implementations. At block 812, the device clock may be advanced by a time offset relative to the reference clock. In some implementations, the time offset is predetermined to be larger than the typical drift of the clocks (e.g., of the reference clock and/or the device clock), to allow sufficient widening of a future communication window with the parent network device and not to miss the start of the future transmission by the parent network device. The typical drift may be known from field testing.

At block 813, the device clock may be used to open a reception window to receive a message, which may be the same (or different) than the third message of method 800A. The message may be sent by the parent network device. The reception window may be opened when the reading of the device matches an expected time of reception of the message (e.g., an expected start of the next communication window with the parent network device).

At block 814, method 800B may continue with the device clock being adjusted again, in view of the timing of reception of the message. For example, the device clock may be adjusted (e.g., by the network device hardware) based upon the timing of detection of an access code or header in the message. In some implementations, the device clock may be adjusted in view of a value of the connection event counter. For example, the connection event counter CEC may be incremented upon reception of the message or based on the passage of time that is equal or approximately equal to the connection interval $T_0$ since the last connection event. The device clock may be adjusted to be in alignment with the clock of the parent network device clock, which is assumed to have a value $CEC \times T_0$ (plus an offset that is independent of CEC). The device clock may then be used to adjust the reference clock, as described above in conjunction with block 811. Operations of blocks 811-814 may be repeated multiple times, e.g., for the duration of the communication connection between the network device and the parent network device.

In some implementations, the reference clock and the device clock may be the same clock. In such implementations, the advancement of the device clock may be performed virtually, by the software of the network device.

FIG. 8C depicts a flow diagram of an example method 800C of using the common indication of time for performance of a synchronous action, according to some implementations. In some implementations, method 800C may be performed in conjunction with method 800A described above. At block 821, a first clock value may be recorded by a network device. For example the first clock value may be associated with a message received by the first network device, as described above in conjunction with block 802 of method 800A. In some implementations, the first clock value may be associated with a time of reception of the message. In some implementations, the first clock value may have been included in the message sent by the parent network device.

At block 822, a time stamp may be generated. In some implementations, the time stamp may indicate a time of a future event. In some implementations, the device clock of the network device may be updated to be aligned with the clock of the parent network device. In some implementations, a specified delay time may be added to the first clock value to generate the time stamp. The future event may be a future connection event, a future communication window, a future action to be performed (such as a synchronous measurement), etc. In some implementations, the delay may be specified by the parent network device or passed on from a central device of the network. In some implementations, a device different from the parent network device or the central device may specify the delay time included in the first message.

At block 823, an action may be performed in association with the future event. e.g., a communication window is opened, a message is sent, a measurement is taken, and the like. The action may be performed when the value of the clock (e.g., a second clock value) matches (e.g., reaches or exceeds) the value of the time stamp (e.g., the time of receiving the first message plus the delay time). In some implementations, the action may be performed synchronously with other devices of the wireless network (e.g., child devices, parent devices, etc.).

FIG. 9 depicts a flow diagram of an example method 900 of structuring a data flow in a wireless network, according to some implementations. In some applications, the wireless network of devices may be optimized to efficiently pass data in a target direction. It should be understood, however, that each connection event (e.g., each connection event between any two devices) may have the capability of passing data in both directions, e.g., to facilitate aggregation of data at a central node and dissemination of instructions away from the central node. The direction of optimized data flow (from sources nodes to destination node(s)) is herein referred to as the downstream direction whereas the opposite direction is referred to as the upstream direction. The wireless network may have a plurality of source nodes, one or more destination nodes, and a plurality of intermediate nodes (which may be additionally arranged into one or more layers or levels of nodes), each of the plurality of intermediate nodes having a downstream node and a plurality of upstream nodes. An intermediate node may act as a parent node for some wireless links and as a child node for other wireless links. For example, referring back to FIG. 3, intermediate node 306-1 may have downstream parent node 304-1 and upstream child nodes 308-1, 308-2, and 308-3.

At block 901, the intermediate node (e.g., node 306-1) may receive, from each one of the plurality of upstream nodes (e.g., nodes 308-1, 308-2, and 308-3), a corresponding upstream message of a plurality of upstream messages. Each upstream message may be received within a respective reception window of a plurality of reception windows (e.g., RX window of CE 522-1, RX window of CE 522-2, and RX window of CE 522-3, as depicted in FIG. 5).

As indicated with optional block 902, method 900 may include opening each of the plurality of reception windows at a respective one of a plurality of reception time offsets. The time offsets may be determined relative to the time associated with a reception window of the downstream node. For example, time offsets associated with the start of each of RX window of CE 522-1, RX window of CE 522-2, and RX window of CE 522-3 (referring to FIG. 5) may be determined relative to time $t_1$, which may be associated with a previous reception window RX of CE 509.

At block 903, method 900 may continue with transmitting, by the intermediate node (e.g., node 306-1) to the downstream node (e.g., node 304-1), a downstream message generated using the plurality of upstream messages. For example, the intermediate node may aggregate the received data and include the aggregated data in the downstream message. The intermediate node may also include additional data (e.g., measurements taken by a device associated with the intermediate node) in the downstream message. The downstream message may be transmitted within a transmission window (e.g., TX window of CE 520) that is subsequent to the plurality of reception windows (e.g., RX window of CE 522-1, RX window of CE 522-2, and RX window of CE 522-3). In some implementations, the transmission window may open after a delay following the close of the last reception window (e.g., RX window of CE 522-3) allowing the intermediate node to aggregate data during a data aggregation window (e.g., AW 526). In some implementations, as depicted in FIG. 5, the reception windows may be non-overlapping and have a fixed offset with respect to each other. In some implementations, the reception windows may be equally (evenly) spaced in time to within a predetermined accuracy, e.g., to the accuracy of a device clock, the accuracy mandated by an application supported by the wireless network, and so on. As illustrated in FIG. 5, interval 524-1 may be the same (or approximately the same) as interval 524-2.

Such connection event spacing may be propagated upstream throughout the entire wireless network. In some implementations, utilizing fixed offsets between connection events may enable communication timings to remain stable to optimize data flow and to accommodate and compensate for clock drift/jitter that occurs between time synchronization events (as described in conjunction with FIGS. 8A-C). In some implementations, time synchronization may occur for each connection interval of downstream data transmission. In some implementations, time synchronization may be performed once every set number of connection intervals of downstream data transmission. In some implementations, data may flow throughout the entire wireless network in a single connection interval. For example, at the beginning of the connection interval, source nodes (e.g., nodes of nth level) may transmit data to nodes of the next, n–1th, level. Nodes of n–1th level may aggregate data and send aggregated data the next downstream level until the aggregated data reaches the destination node (e.g., the root node) near the end of the connection interval. The next connection interval may then begin.

In some implementations, the transmission window of a downstream connection event may be a part of a downstream connection event. For example, TX window of CE 520 is a part of CE 520. Similarly, each of the plurality of reception windows may be a part of a corresponding upstream connection event of a plurality of upstream connection events (e.g., RX windows of CE 522-1, CE 522-2, and CE 522-3, are parts of the corresponding CE 522-1, CE 522-2, and CE 522-3, respectively). In some implementations, since the amount of accumulated and transmitted data may increase with each layer of nodes, the TX window is wider than a respective TX window of each of the plurality of upstream connection events (e.g., TX window of CE 520 is wider than TX windows of CE 530-$k$). In some implementations, the transmission window may be a part of a downstream connection event (e.g., CE 520) that also includes a downstream reception window (e.g., RX of CE 520). Similarly, each reception window of the plurality of reception windows (e.g., RX of CE 522-$k$) may be associated with a respective upstream connection event (e.g., CE 530-$k$) that also includes a reception window (RX of CE 530-$k$) that is wider than the downstream reception window (e.g., wider than RX of CE 520).

In some implementations, as indicated with an optional block 904, method 900 may include opening the downstream connection event (e.g., CE 520) at a time that is advanced compared with an expected communication time (e.g., start of CE 510). The expected communication time may be determined as a sum of i) a time associated with a previous connection event of the downstream node and ii) a downstream node connection interval (e.g., $T_0$). In some implementations, a set time advancement may be applied for the duration of the wireless connection, until network settings are changed, and so on. Similar set time advancements may be applied to connection events managed by other devices, e.g., various upstream devices. For example, node 308-1 may start CE 530-1 in advance of CE 522-1.

As indicated with an optional block 905, method 900 may include receiving, during the transmission window (e.g., TW of CE 520), instructions from the downstream node (e.g., node 304-1) for the intermediate node and/or for one or more of the upstream nodes. The received instructions may be related to future actions, future communications, changes of the settings of the wireless network, and the like. Similarly, during the reception windows (such as RX window of CE 522-1, RX window of CE 522-2, and RX window of CE 522-3) the intermediate node may transmit one or more messages to the upstream nodes (e.g., nodes 308-1, 308-2, and 308-3), including passing on instructions previously received from the downstream node.

FIG. 10 depicts a flow diagram of an example method 1000 of managing communication channels in a wireless network, according to some implementations. The network of wireless devices may be organized into n layers of nodes, where number n may be any integer number greater than two. The wireless network can have devices arranged in a tree of nodes, e.g., a tree of nodes depicted in FIG. 7. Method 1000 may be used to optimize multiple wireless communication links that may be scheduled to communicate data during overlapping time windows. Wireless links that occur simultaneously (e.g., that overlap in time) may avoid interference by utilizing different communication frequencies (e.g., wireless communication channels). Method 1000 may be used to assign different communication frequencies to such simultaneously communicating links. Nodes of the wireless network may be classified into nodes of the first layer (e.g., root node 710 in FIG. 7), nodes of the second layer (e.g., nodes 720 and 722 in FIG. 7), nodes of the third layer (e.g., nodes 730-736 in FIG. 7), and so on, up to the nodes of the last, nth, layer (e.g., nodes 740-749 in FIG. 7). Method 1000 may be performed by a processing logic of a control device of the wireless network, e.g., by node 710, a device associated with node 710, of any other suitable device.

At block 1001, the processing logic performing method 1000 may identify (e.g., based on stored topology of the network) that a first node of the n–1th layer (e.g., node 730) supports a first plurality of wireless links (e.g., links 704-$j$) ascending to the first node of the n–1th layer and a first wireless link (e.g., link 702-1) ascending from the first node of the n–1th layer to a first node of an n–2th layer (e.g., node 720). In some implementations, the first node of the n–1th layer may be in control (e.g., may act as a parent device) of each of the first plurality of wireless links ascending to that node. In some implementations, the first node of the n–1th layer (e.g., node 730) may receive instructions related to the utilization of the first wireless link (e.g., link 702-1) from the first node of the n–2th layer of nodes (e.g., node 720).

At block 1002, the processing logic may assign to each of the first plurality of wireless links (e.g., links 704-1, 704-2, and 704-3) a respective set of WCCs (e.g., sets $\{C\}^{(0)}$, $\{C\}^{(1)}$, and $\{C\}^{(2)}$, respectively) of a first plurality of sets of WCCs. In some implementations, all sets of the first plurality of sets of WCCs may be the same (e.g., each of $\{C\}^{(0)}$, $\{C\}^{(1)}$, and $\{C\}^{(2)}$ may have identical sets of channels). In some implementations, different sets of the first plurality of sets of WCCs may be overlapping (e.g., $\{C\}^{(0)}$ may share some but not all WCCs with $\{C\}^{(1)}$ and/or $\{C\}^{(2)}$). In some implementations, the sets in the first plurality of sets of WCCs may be non-overlapping (e.g., no WCC enters more than one of $\{C\}^{(0)}$, $\{C\}^{(1)}$, and $\{C\}^{(2)}$).

At block 1003, the processing logic may identify that a second node of the n–1th layer of nodes (e.g., node 732) supports a second plurality of wireless links (e.g., links 705-$j$) ascending to the second node of the n–1th layer of nodes and a second wireless link (e.g., link 702-1) ascending from the second node of the n–1th layer of nodes to the first node of the n–2th layer of nodes (e.g., node 720).

At block 1004, method 1000 may continue with the processing logic assigning to each of the second plurality of wireless links (e.g., links 705-1 and 705-2) a respective set of WCCs (e.g., sets $\{C\}^{(3)}$ and $\{C\}^{(4)}$, respectively) of a second plurality of sets of WCCs. Similarly to the above-described first plurality of WCCs, the channels of the second plurality of WCCs may be non-overlapping, partially overlapping, or identical to each other. Furthermore, WCCs of the first plurality of sets of WCCs (e.g., sets $\{C\}^{(0)}$, $\{C\}^{(1)}$, and $\{C\}^{(2)}$) may be non-overlapping with the second plurality of sets of WCCs. Various sets of WCCs may be spaced by one or more unused (unassigned) WCCs.

It should be understood that blocks 1001-1004 illustrate only a portion of operations related to the assignment of wireless links and that various other wireless links (e.g., all wireless links of the network) may be assigned similarly. For example, a third plurality of sets of WCCs (e.g., sets $\{C\}^{(5)}$ and $\{C\}^{(6)}$) may be assigned to the wireless links 706-j ascending to a second node of the n−1th layer of nodes (e.g., node 734), and so on. The references to "first," "second," etc., should be understood as identifiers only and do not presuppose any specific ranking of corresponding elements and components or an order of assignment of WCCs.

In some implementations, wireless links that are assigned identical sets of WCCs may be time-multiplexed, e.g., communications over such links may happen at different times, such as during non-overlapping communication (transmission and reception) windows. Wireless links that are used concurrently may be assigned sets of non-overlapping or partially-overlapping WCCs.

At block 1005, the processing logic may assign to the first wireless link (e.g., link 702-1) ascending from the first node of n−1th layer to a first node of n−2th layer, a first combined set of WCCs. The first combined set of WCCs may include at least one WCC of the first plurality of sets of WCCs (e.g., sets $\{C\}^{(0)}$, $\{C\}^{(1)}$, and $\{C\}^{(2)}$) and at least one WCC of the second plurality of sets of WCCs (e.g., $\{C\}^{(2)}$ and/or $\{C\}^{(3)}$. In some implementations, the first combined set may include all sets (e.g., be a union) of the first plurality of sets of WCCs and the second plurality of sets of WCCs (e.g., the union of sets $\{C\}^{(0)} \ldots \{C\}^{(4)}$).

Similarly, the processing logic may assign the same first combined set to the second wireless link (e.g., link 702-2) ascending from the second node of n−1th layer to a first node of n−2th layer. The processing logic may further assign additional combined sets of WCCs to other wireless links. For example, both a third wireless link (e.g., link 703-1) ascending from a third node of n−1th layer (e.g., node 734) to a second node of n−2th layer (e.g., node 722) and a fourth wireless link (e.g., link 703-2) ascending from the fourth node of n−1th layer (e.g., node 736) to the second node of n−2th layer (e.g., node 722) may be assigned a second combined set of WCCs (e.g., a union of sets $\{C\}^{(5)} \ldots \{C\}^{(9)}$).

The assignment of unions of sets of WCCs may be continued for downstream nodes as well. For example, a third wireless link may be ascending from the first node of the n−2th LN (e.g., node 720) to a first node of an n−3th LN (e.g., node 710) and a fourth wireless link may be ascending from the second node of the n−2th LN (e.g., node 722) to the (same) first node of the n−3th LN. Accordingly, each of the third WL and the fourth WL may be assigned a union of the first combined set of WCCs (e.g., the combination of sets $\{C\}^{(0)} \ldots \{C\}^{(4)}$) and the second combined set of WCCs, (e.g., the combination of sets $\{C\}^{(5)} \ldots \{C\}^{(9)}$).

In some implementations, method 1000 may include, at optional block 1006, obtaining information characterizing link quality of the first plurality of sets of WCCs. The obtained information may be based on various metrics for the respective WCCs (e.g., RSSI, SNR, and the like) and may indicate that some WCCs may be providing inadequate or suboptimal connectivity. Responsive to receiving such information, the processing device performing method 1000 may communicate, at block 1007, instructions to the first node of the n−1th LN not to use one or more WCCs of the first plurality of sets of WCCs. Similar instructions may be communicated to various other upstream and downstream nodes assigned the same underperforming WCCs.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

The invention claimed is:

1. A method of time synchronization in a wireless network, the method comprising:
    receiving, by a network device from a parent network device, via a first link of the wireless network, a first message, wherein the wireless network is a Bluetooth network or a Bluetooth Low Energy network;
    establishing a first common indication of time between the network device and the parent network device in view of at least one of (i) a connection interval associated with the first message or (ii) a first clock value associated with the first message;
    adjusting a reference clock of the network device using the first common indication of time and advancing a device clock of the network device by a time offset relative to the reference clock;
    using the device clock to start a reception window to receive a third message from the parent network device;
    adjusting the device clock in view of at least one of a value of a connection event counter associated with the third message or a timing of reception of the third message;
    updating the first common indication of time in view of the third message; and
    communicating, by the network device to a child network device, via a second link of the wireless network, a second message, the second message causing the child network device to establish a second common indication of time with the network device.

2. The method of claim 1, wherein the third message comprises a connection event counter, and wherein updating the first common indication of time comprises multiplying the connection event counter by the connection interval.

3. The method of claim 1, wherein the first common indication of time is updated using a time of reception of the third message.

4. The method of claim 1, further comprising: recording the first clock value; generating a time stamp for a future event based on the first clock value and a delay time; and performing an action when a second clock value of a clock of the network device matches the time stamp.

5. The method of claim 4, wherein the action is performed synchronously with an action performed by the parent network device and an action performed by the child network device.

6. The method of claim 1, wherein devices in the wireless network are arranged in a scatternet topology, the devices comprising the network device, the parent network device, and the child network device.

7. The method of claim 1, wherein the wireless network comprises: a level-0 device, a plurality of level-1 devices, wherein each of the plurality of level-1 devices is connected wirelessly with the level-0 device, and a plurality of level-2 devices, each of the plurality of level-2 devices connected wirelessly with at least one of the plurality of level-1 devices.

8. An apparatus comprising:
    a radio configured to support wireless connectivity with a wireless network; a memory device; and
    a processing device communicatively coupled to the memory device, the processing device configured to:
    receive, from a parent device, via a first link of the wireless network, a first message during a first connection event;
    establish a first common indication of time with the parent device in view of at least one of (i) a connection interval or (ii) a first clock value associated with the first message, wherein the first message comprises a connection event counter, and wherein updating the first common indication of time comprises multiplying the connection event counter by the connection interval; and
    communicate to a child device, via a second link of the wireless network, a second message, the second message configured to cause the child device to generate a second common indication of time with the apparatus.

9. The apparatus of claim 8, wherein the processing device is further configured to:
    receive, from the parent device, a third message; and
    update the first common indication of time in view of the third message.

10. The apparatus of claim 9, wherein the processing device is further configured to:
    adjust a reference clock of the apparatus using the first common indication of time;
    advance a device clock of the apparatus by a time offset relative to the reference clock;
    use the device clock to start a reception window to receive the third message; and
    adjust the device clock in view of at least one of: value of a connection event counter associated with the third message, or a timing of reception of the third message.

11. The apparatus of claim 8, wherein the processing device is further configured to: record the first clock value; generate a time stamp for a future event based on the first clock value and a delay; and
    perform an action when a second clock value of a clock of the apparatus matches the time stamp.

12. The apparatus of claim 11, wherein the action is performed synchronously with an action performed by the parent device and an action performed by the child device.

13. A system comprising: a parent device configured to generate a first message;
    an intermediate device configured to: receive, from the parent device, via a first link of a wireless network, the first message;
    establish a first common indication of time with the parent device in view of at least one of (i) a connection interval associated with the first message or (ii) a first clock value associated with the first message, adjust a reference clock of the intermediate device using the first common indication of time, advance a device clock of the intermediate device by a time offset relative to the reference clock and use the device clock to start a reception window to receive the third message, and adjust the device clock in view of at least one of: a value of a connection event counter associated with the third message, or a timing of reception of the third message, the intermediate device further configured to receive, from the parent device, a third message and update the first common indication of time in view of the third message, and generate, in view of the first common indication of time, a plurality of second messages; and a plurality of child devices, each of the plurality of child devices configured to: receive, from the intermediate device, via a respective link of a plurality of second links of the wireless network, a respective second message of the plurality of second messages;

establish, in view of the respective second message, a second common indication of time with the intermediate device; and perform, using the second common indication of time an action, the action being performed synchronously by each of the plurality of child devices.

14. The system of claim 13, wherein the intermediate device is further configured to: record the first clock value;

generate a time stamp for a future event based on the first clock value and a delay; and perform the action when a second clock value of a clock of the intermediate device matches the time stamp.

15. The system of claim 14, wherein each of the parent device and intermediate device are configured to perform the action synchronously with performance of the action by each of the plurality of child devices.

* * * * *